United States Patent
Lisy et al.

(10) Patent No.: US 12,067,585 B2
(45) Date of Patent: *Aug. 20, 2024

(54) METHODS AND SYSTEMS FOR DETERMINING A TRAVEL PROPENSITY CONFIGURED FOR USE IN THE GENERATION OF A SUPPLY INDEX INDICATIVE OF A QUALITY OF AVAILABLE SUPPLY

(71) Applicant: Bytedance Inc., Wilmington, DE (US)

(72) Inventors: Andrew Lisy, River Forest, IL (US); Becky Nixon Center, Chicago, IL (US); Yingchu Zheng, Chicago, IL (US); Eric Hanson, Western Springs, IL (US)

(73) Assignee: BYTEDANCE INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/063,571

(22) Filed: Dec. 8, 2022

(65) Prior Publication Data

US 2023/0177544 A1 Jun. 8, 2023

Related U.S. Application Data

(63) Continuation of application No. 16/229,304, filed on Dec. 21, 2018, now Pat. No. 11,551,247.

(Continued)

(51) Int. Cl.
*G06Q 30/0204* (2023.01)
*G06Q 30/0201* (2023.01)
(Continued)

(52) U.S. Cl.
CPC ..... *G06Q 30/0205* (2013.01); *G06Q 30/0201* (2013.01); *G06Q 30/0224* (2013.01); *H04W 4/021* (2013.01)

(58) Field of Classification Search
CPC .......... G06Q 30/0205; G06Q 30/0201; G06Q 30/0224; H04W 4/021
See application file for complete search history.

(56) References Cited

U.S. PATENT DOCUMENTS 5,032,989 A 7/1991 Tornetta
5,361,201 A 11/1994 Jost et al.
(Continued)

FOREIGN PATENT DOCUMENTS

WO 2009/151925 A2 12/2009

OTHER PUBLICATIONS

U.S. Appl. No. 13/826,866, filed Mar. 14, 2013, In re: Shariff et al. entitled Method, Apparatus, and Computer Program Product for Calculating a Provider Quality Score, U.S. Appl. No. 13/826,866.
(Continued)

*Primary Examiner* — Nadja N Chong Cruz
(74) *Attorney, Agent, or Firm* — Alston & Bird LLP

(57) ABSTRACT

A method, apparatus, and computer program, each configured for determining a travel propensity, the travel propensity being a distance a customer is willing to travel to redeem a renderable data object, are provided An exemplary method comprises classifying each of a plurality of geographic regions as one geographic region type of a plurality of geographic region types, mapping each of a plurality of redemption locations to a geographic region type, calculating, for a first geographic region type, a first distance that accounts for a predefined number of redemptions, determining a number of merchants having redemption locations within the first distance, calculating a second distance, from a center of a geographic region of the second geographic region type, necessary to include the number of merchants (Continued)

having redemption locations within the first distance, and assigning the second distance as the second geographic region type travel propensity.

20 Claims, 10 Drawing Sheets

Related U.S. Application Data

(60) Provisional application No. 62/612,234, filed on Dec. 29, 2017.

(51) Int. Cl.
*G06Q 30/0207* (2023.01)
*H04W 4/021* (2018.01)

(56) References Cited

U.S. PATENT DOCUMENTS

| | | | |
|---|---|---|---|
| 5,420,968 A | 5/1995 | Johri | |
| 5,680,305 A | 10/1997 | Apgar, IV | |
| 6,604,083 B1 | 8/2003 | Bailey | |
| 6,862,572 B1 | 3/2005 | De Sylva | |
| 7,043,445 B2 | 5/2006 | Bailey | |
| 7,412,398 B1 | 8/2008 | Bailey | |
| 7,516,085 B2 | 4/2009 | Bailey | |
| 7,752,069 B1 | 7/2010 | Bailey | |
| 8,650,072 B2 | 2/2014 | Mason et al. | |
| 8,676,668 B2 | 3/2014 | Wolfe | |
| 9,058,604 B2 | 6/2015 | Carr et al. | |
| 9,940,635 B1 | 4/2018 | Shariff et al. | |
| 10,108,974 B1 | 10/2018 | Shariff et al. | |
| 10,219,105 B1 | 2/2019 | Sawin et al. | |
| 10,438,242 B1 | 10/2019 | Carr et al. | |
| 10,783,554 B1 | 9/2020 | Hylton et al. | |
| 10,977,678 B1 | 4/2021 | Joseph | |
| 11,074,600 B2 | 7/2021 | Shariff et al. | |
| 11,392,971 B1 | 7/2022 | Lisy et al. | |
| 11,551,247 B1 | 1/2023 | Lisy et al. | |
| 2005/0055275 A1 | 3/2005 | Newman et al. | |
| 2007/0061363 A1 | 3/2007 | Ramer et al. | |
| 2008/0133124 A1 | 6/2008 | Sarkeshik | |
| 2009/0012866 A1 | 1/2009 | Celik et al. | |
| 2009/0271260 A1 | 10/2009 | Sharma et al. | |
| 2009/0319401 A1 | 12/2009 | Rao et al. | |
| 2011/0010245 A1 | 1/2011 | Priebatsch et al. | |
| 2011/0035284 A1 | 2/2011 | Moshfeghi | |
| 2011/0106622 A1 | 5/2011 | Kuhlman et al. | |
| 2011/0251875 A1 | 10/2011 | Cosman | |
| 2014/0172573 A1 | 6/2014 | Saurabh | |
| 2014/0195344 A1 | 7/2014 | Chand et al. | |
| 2014/0214461 A1 | 7/2014 | Diliberto et al. | |
| 2014/0243025 A1 | 8/2014 | Alsehly et al. | |
| 2014/0279010 A1 | 9/2014 | Calman et al. | |
| 2015/0262245 A1 | 9/2015 | Arvanitis | |
| 2015/0348083 A1 | 12/2015 | Brill et al. | |
| 2016/0086222 A1 | 3/2016 | Kurapati | |
| 2017/0127233 A1 | 5/2017 | Liang et al. | |
| 2017/0351978 A1 | 12/2017 | Bellowe | |
| 2018/0218322 A1 | 8/2018 | Bhargava et al. | |
| 2018/0339960 A1 | 11/2018 | Malkas et al. | |
| 2021/0390568 A1 | 12/2021 | Shariff et al. | |

OTHER PUBLICATIONS

U.S. Appl. No. 62/587,881, filed Nov. 17, 2017, In re: Lerner et al. entitled Clustering and Coranking of Multi-source Location Data, U.S. Appl. No. 62/587,881.

Applebaum, William, Methods for Determining Store Trade Areas, Market Penetration, and Potential Sales Journal of Marketing Research, vol. 111, May 1966 (Year: 1966).

Burner, James A. et al., The Influence of Driving Time upon Shopping Centre Preference Journal of Marketing, vol. 32, Apr. 1968 (Year: 1968).

Freehling, John, Using Drive Times to Construct Trading Areas GIS in Business Conference Proceedings, 1993 (Year: 1993).

International Search Report and Written Opinion for corresponding International Application No. PCT/US2018/067185, dated Mar. 1, 2019, 15 pages.

Spiekermann, Sarah et al., Street Marketing: How Proximity and Context drive Coupon Redemption Apr. 2010 (Year: 2010).

What is Drive Time Mailing and How is it Different from Radius Mailing? Conquest Graphics Blog, 2019 (Year: 2019).

METHODS AND SYSTEMS FOR DETERMINING A TRAVEL PROPENSITY CONFIGURED FOR USE IN THE GENERATION OF A SUPPLY INDEX INDICATIVE OF A QUALITY OF AVAILABLE SUPPLY

CROSS-REFERENCE TO RELATED APPLICATIONS

This application is a Continuation of U.S. application Ser. No. 16/229,304, filed Dec. 21, 2018, which claims benefit of U.S. Provisional Application No. 62/612,234 filed Dec. 29, 2017, the content of which is incorporated herein by reference in its entirety.

TECHNOLOGICAL FIELD

Example embodiments of the present invention relate generally to gauging the health, quality, or general adequacy of available supply and, more particularly, to methods and systems for determining a travel propensity for use in the generation of a supply index indicative of a quality (e.g., health) of supply.

BACKGROUND

The applicant has discovered problems with current methods, systems, and apparatuses for determining, calculating, or otherwise gauging the health, quality, or general adequacy of available supply. Through applied effort, ingenuity, and innovation, Applicant has solved many of these identified problems by developing a solution that is embodied by the present invention, which is described in detail below.

BRIEF SUMMARY

Accordingly, a method, apparatus, and computer program, each configured for determining, calculating, or otherwise gauging the health or quality of available supply, are provided. In particular, method, apparatus, and computer program are described herein for determining a travel propensity for use in the generation of a supply index indicative of a quality (e.g., health) of supply by calculating and aggregating a supply metric calculated from a perspective of each of a plurality of individual customers, each of the plurality of individual customers associated with a user location, for a purpose of identifying those locations where an increase in supply would most positively impact value to customers.

In some embodiments, a method may be provided for determining a travel propensity, the travel propensity being a distance a customer is willing to travel to redeem a renderable data object, travel propensity being a binary function, the method comprising classifying each of a plurality of geographic regions as one geographic region type of a predefined number of geographic region types, mapping each of a plurality of redemption locations, each redemption location associated with a merchant and indicative of a location at which a renderable data object is redeemable, to one of the geographic region types, calculating, for a first geographic region type, a first distance that accounts for a predefined number of redemptions, based on historical purchase data, assigning the first distance as a first geographic region type travel propensity, determining a number of merchants having redemption locations within the first distance, calculating a second distance, from a center of a geographic region of the second geographic region type, necessary to include the number of merchants having redemption locations within the first distance, and assigning the second distance as the second geographic region type travel propensity.

In some embodiments, the method may further comprise identifying a first location associated with a first user, determining the geographic region type from the plurality of geographic region types to which the particular location associated with the first user belongs, accessing a distance calculated as the travel propensity for the geographic region type from the plurality of geographic region types to which the particular location associated with the first user belongs, and assigning the distance as the customer specific travel propensity, the customer specific travel propensity configured to be utilized to identify a number of merchants having redemption locations within the distance. In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, the identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, the travel propensity of the single GPS location is calculated based on the number of GPS locations representative of the portion of the plurality of GPS device locations from the geographic region clustered to the single GPS location.

In some embodiments, an apparatus may be provided for determining a travel propensity, the travel propensity being a distance a customer is willing to travel to redeem a renderable data object, travel propensity being a binary function, the apparatus comprising at least one processor and at least one memory including computer program code, the at least one memory and the computer program code configured to, with the processor, cause the apparatus to at least classify each of a plurality of geographic regions as one geographic region type of a predefined number of geographic region types, map each of a plurality of redemption locations, each redemption location associated with a merchant and indicative of a location at which a renderable data object is redeemable, to one of the geographic region types, calculate, for a first geographic region type, a first distance that accounts for a predefined number of redemptions, based on historical purchase data, assign the first distance as a first geographic region type travel propensity, determine a number of merchants having redemption locations within the first distance, calculate a second distance, from a center of a geographic region of the second geographic region type, necessary to include the number of merchants having redemption locations within the first distance, and assign the second distance as the second geographic region type travel propensity.

In some embodiments, the at least one memory and the computer program code are further configured to, with the processor, cause the apparatus to identify a first location associated with a first user, determine the geographic region type from the plurality of geographic region types to which the particular location associated with the first user belongs, access a distance calculated as the travel propensity for the geographic region type from the plurality of geographic region types to which the particular location associated with the first user belongs, and assign the distance as the customer specific travel propensity, the customer specific travel propensity configured to be utilized to identify a number of merchants having redemption locations within the distance. In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, the travel propensity of the single GPS location is calculated based on the number of GPS locations representative of the portion of the plurality of GPS device locations from the geographic region clustered to the single GPS location.

In some embodiments, a computer program product may be provided for determining a travel propensity, the travel propensity being a distance a customer is willing to travel to redeem a renderable data object, travel propensity being a binary function, the computer program product comprising at least one non-transitory computer-readable storage medium having computer-executable program code instructions stored therein, the computer-executable program code instructions comprising program code instructions for classifying each of a plurality of geographic regions as one geographic region type of a predefined number of geographic region types, mapping each of a plurality of redemption locations, each redemption location associated with a merchant and indicative of a location at which a renderable data object is redeemable, to one of the geographic region types, calculating, for a first geographic region type, a first distance that accounts for a predefined number of redemptions, based on historical purchase data, assigning the first distance as a first geographic region type travel propensity, determining a number of merchants having redemption locations within the first distance, calculating a second distance, from a center of a geographic region of the second geographic region type, necessary to include the number of merchants having redemption locations within the first distance, and assigning the second distance as the second geographic region type travel propensity.

In some embodiments, the computer-executable program code instructions further comprise program code instructions for identifying a first location associated with a first user, determining the geographic region type from the plurality of geographic region types to which the particular location associated with the first user belongs, accessing a distance calculated as the travel propensity for the geographic region type from the plurality of geographic region types to which the particular location associated with the first user belongs, and assigning the distance as the customer specific travel propensity, the customer specific travel propensity configured to be utilized to identify a number of merchants having redemption locations within the distance. In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified. In some embodiments, the travel propensity of the single GPS location is calculated based on the number of GPS locations representative of the portion of the plurality of GPS device locations from the geographic region clustered to the single GPS location.

In some embodiments, a method may be provided for generating a supply index indicative of a quality of supply by calculating and aggregating a supply metric calculated from a perspective of each of a plurality of individual customers, each of the plurality of individual customers associated with a user location, for a purpose of identifying those locations where an increase in supply would most positively impact value to customers, the method comprising identifying a first location indicative a location of a first user, identifying at least a portion of each of one or more renderable data objects available to a user located at the first location, applying at least a first weight to each of at least the portion of each of the one or more renderable data objects, calculating a summed total of each of the weights of at least the portion of each of the one or more renderable data objects, applying a coverage cap to the summed total to determine a capped total, the coverage cap defined as a number at which providing a single additional renderable data object results in a measureable or objective change in a predetermined metric of less than a pre-defined threshold value, the capped total being set to the coverage cap in an instance in which the coverage cap is less than summed total, and the capped total being capped score is set equal to coverage cap, whereas if coverage cap is greater than summed total, the capped total is set to the summed total, and generating a supply index comprised of aggregated, from each of the plurality of individual customers, capped totals.

In some embodiments, each renderable data object is associated with a specific location and comprises an area from which customers will travel to redeem the renderable data object.

In some embodiments, identifying at least a portion of each of one or more renderable data objects available to a user located at the first location comprises calculating a radius covering a number of merchants at or closest to a predetermined number, for each of a predefined geographic regions.

In some embodiments, applying at least the first weight to each of at least the portion of each of the one or more renderable data objects comprises identifying a value associated with a first metric associated a characteristic of the renderable data object, and multiplying an initial weighting of one by the value resulting in a list of each of at least the portion of each of the one or more renderable data objects and a value indicative of a weighting associated with each of at least the portion of each of the one or more renderable data objects.

In some embodiments, the method further comprising applying at least a second weight to each of at least the portion of each of the one or more renderable data objects, the second weight a function of a decay rate of a metric associated with a characteristic of the renderable data object In some embodiments, the index is comprised of aggregated capped totals in each of a plurality of geographic regions.

In some embodiments, the index further comprises aggregated capped totals for each of a plurality of categories.

In some embodiments, identifying the first location of the first user comprises accessing a defined location from a user profile associated with the first user.

In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of Global Positioning System (GPS) device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, an apparatus may be provided for generating a supply index indicative of a quality of supply by calculating and aggregating a supply metric calculated from a perspective of each of a plurality of individual customers, each of the plurality of individual customers associated with a user location, for a purpose of identifying those locations where an increase in supply would most positively impact value to customers, the apparatus comprising at least one processor and at least one memory including computer program code, the at least one memory and the computer program code configured to, with the processor, cause the apparatus to at least identify a first location indicative a location of a first user, identify at least a portion of each of one or more renderable data objects available to a user located at the first location, apply at least a first weight to each of at least the portion of each of the one or more renderable data objects, calculate a summed total of each of the weights of at least the portion of each of the one or more renderable data objects, apply a coverage cap to the summed total to determine a capped total, the coverage cap defined as a number at which providing a single additional renderable data object results in a measureable or objective change in a predetermined metric of less than a pre-defined threshold value, the capped total being set to the coverage cap in an instance in which the coverage cap is less than summed total, and the capped total being capped score is set equal to coverage cap, whereas if coverage cap is greater than summed total, the capped total is set to the summed total, and generate a supply index comprised of aggregated, from each of the plurality of individual customers, capped totals.

A computer program product may be provided for generating a supply index indicative of a quality of supply by calculating and aggregating a supply metric calculated from a perspective of each of a plurality of individual customers, each of the plurality of individual customers associated with a user location, for a purpose of identifying those locations where an increase in supply would most positively impact value to customers, the computer program product comprising at least one non-transitory computer-readable storage medium having computer-executable program code instructions stored therein, the computer-executable program code instructions comprising program code instructions for identifying a first location indicative a location of a first user, identifying at least a portion of each of one or more renderable data objects available to a user located at the first location, applying at least a first weight to each of at least the portion of each of the one or more renderable data objects, calculating a summed total of each of the weights of at least the portion of each of the one or more renderable data objects, applying a coverage cap to the summed total to determine a capped total, the coverage cap defined as a number at which providing a single additional renderable data object results in a measureable or objective change in a predetermined metric of less than a pre-defined threshold value, the capped total being set to the coverage cap in an instance in which the coverage cap is less than summed total, and the capped total being capped score is set equal to coverage cap, whereas if coverage cap is greater than summed total, the capped total is set to the summed total, and generating a supply index comprised of aggregated, from each of the plurality of individual customers, capped totals.

In some embodiments, a method may be provided for determining a travel propensity, the travel propensity being a distance a customer is willing to travel to redeem a renderable data object, travel propensity being a binary function, the method comprising classifying each of a plurality of geographic regions as one geographic region type of a predefined number of geographic region types, mapping each of a plurality of redemption locations, each redemption location associated with a merchant and indicative of a location at which a renderable data object is redeemable, to one of the geographic region types, calculating, for a first geographic region type, a first distance that accounts for a predefined number of redemptions, based on historical purchase data, assigning the first distance as a first geographic region type travel propensity, determining a number of merchants having redemption locations within the first distance, calculating a second distance, from a center of a geographic region of the second geographic region type, necessary to include the number of merchants having redemption locations within the first distance, and assigning the second distance as the second geographic region type travel propensity.

In some embodiments, the method may further comprise identifying a first location associated with a first user, determining the geographic region type from the plurality of geographic region types to which the particular location associated with the first user belongs, accessing a distance calculated as the travel propensity for the geographic region type from the plurality of geographic region types to which the particular location associated with the first user belongs, and assigning the distance as the customer specific travel propensity, the customer specific travel propensity configured to be utilized to identify a number of merchants having redemption locations within the distance.

In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, the travel propensity of the single GPS location is calculated based on the number of GPS locations representative of the portion of the plurality of GPS device locations from the geographic region clustered to the single GPS location.

In some embodiments, an apparatus may be provided for determining a travel propensity, the travel propensity being a distance a customer is willing to travel to redeem a renderable data object, travel propensity being a binary function, the apparatus comprising at least one processor and at least one memory including computer program code, the at least one memory and the computer program code configured to, with the processor, cause the apparatus to at least classify each of a plurality of geographic regions as one geographic region type of a predefined number of geographic region types, map each of a plurality of redemption locations, each redemption location associated with a merchant and indicative of a location at which a renderable data object is redeemable, to one of the geographic region types, calculate, for a first geographic region type, a first distance that accounts for a predefined number of redemptions, based on historical purchase data, assign the first distance as a first geographic region type travel propensity, determine a number of merchants having redemption locations within the first distance, calculate a second distance, from a center of a geographic region of the second geographic region type, necessary to include the number of merchants having redemption locations within the first distance, and assign the second distance as the second geographic region type travel propensity.

In some embodiments, the at least one memory and the computer program code are further configured to, with the processor, cause the apparatus to identify a first location associated with a first user, determine the geographic region type from the plurality of geographic region types to which the particular location associated with the first user belongs, access a distance calculated as the travel propensity for the geographic region type from the plurality of geographic region types to which the particular location associated with the first user belongs, and assign the distance as the customer specific travel propensity, the customer specific travel propensity configured to be utilized to identify a number of merchants having redemption locations within the distance.

In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, wherein identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, wherein identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, wherein the travel propensity of the single GPS location is calculated based on the number of GPS locations representative of the portion of the plurality of GPS device locations from the geographic region clustered to the single GPS location.

In some embodiments, a computer program product may be provided for determining a travel propensity, the travel propensity being a distance a customer is willing to travel to redeem a renderable data object, travel propensity being a binary function, the computer program product comprising at least one non-transitory computer-readable storage medium having computer-executable program code instructions stored therein, the computer-executable program code instructions comprising program code instructions for classifying each of a plurality of geographic regions as one geographic region type of a predefined number of geographic region types, mapping each of a plurality of redemption locations, each redemption location associated with a merchant and indicative of a location at which a renderable data object is redeemable, to one of the geographic region types, calculating, for a first geographic region type, a first distance that accounts for a predefined number of redemptions, based on historical purchase data, assigning the first distance as a first geographic region type travel propensity, determining a number of merchants having redemption locations within the first distance, calculating a second distance, from a center of a geographic region of the second geographic region type, necessary to include the number of merchants having redemption locations within the first distance, and assigning the second distance as the second geographic region type travel propensity.

In some embodiments, the computer-executable program code instructions further comprise program code instructions for identifying a first location associated with a first user, determining the geographic region type from the plurality of geographic region types to which the particular location associated with the first user belongs, accessing a distance calculated as the travel propensity for the geographic region type from the plurality of geographic region types to which the particular location associated with the first user belongs, and assigning the distance as the customer specific travel propensity, the customer specific travel propensity configured to be utilized to identify a number of merchants having redemption locations within the distance.

In some embodiments, travel propensity is determined by category.

In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device.

In some embodiments, identifying the first location of the first user comprises receiving a plurality of GPS device locations, each from one of a plurality of mobile communication devices, each associated with a different user, clustering a portion of the plurality of GPS device locations from a geographic region to a single GPS location, reducing a number of times at least a portion of each of one or more renderable data objects available to a user located at the first location must be identified.

In some embodiments, wherein the travel propensity of the single GPS location is calculated based on the number of GPS locations representative of the portion of the plurality of GPS device locations from the geographic region clustered to the single GPS location.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
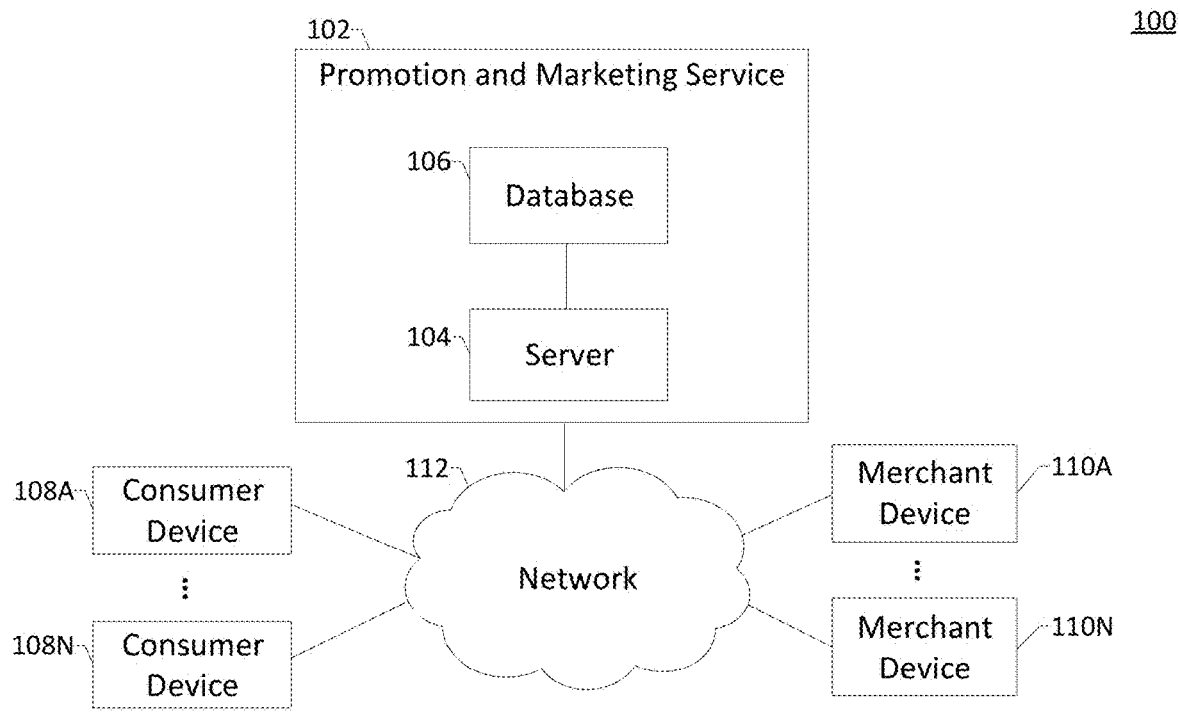
Figure 2:
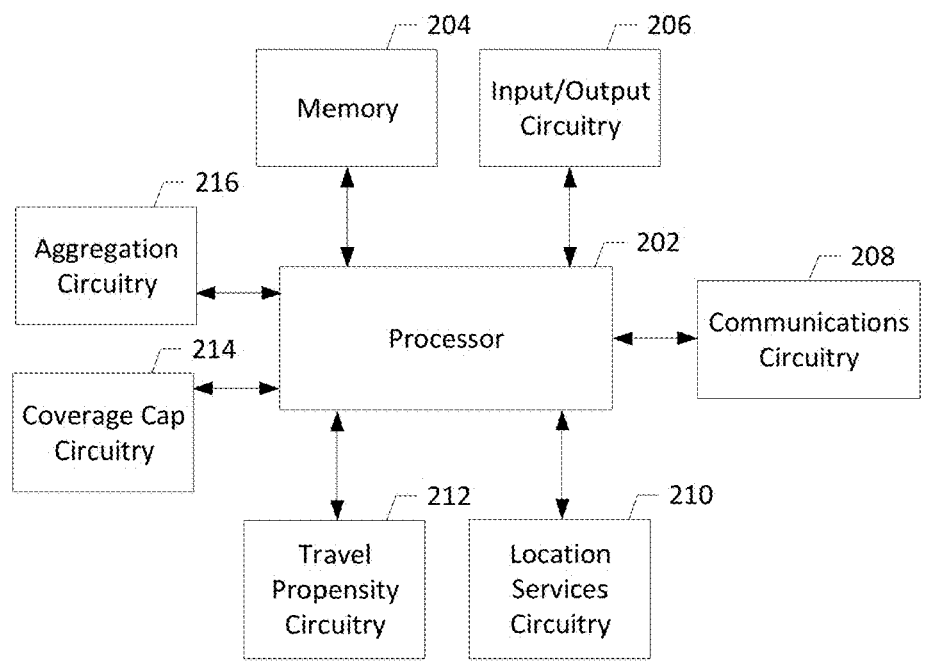
Figure 3:
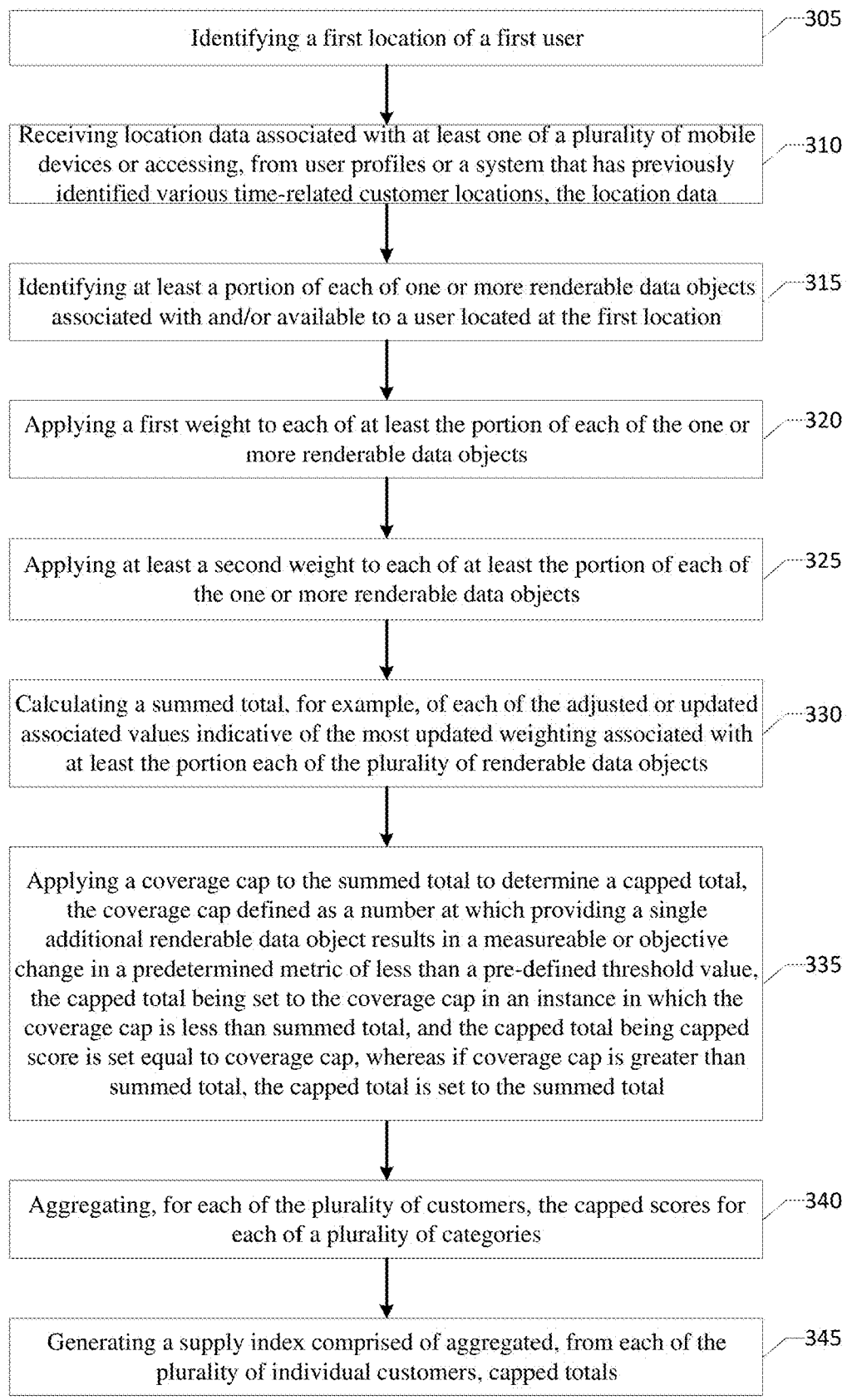
Figure 4A:
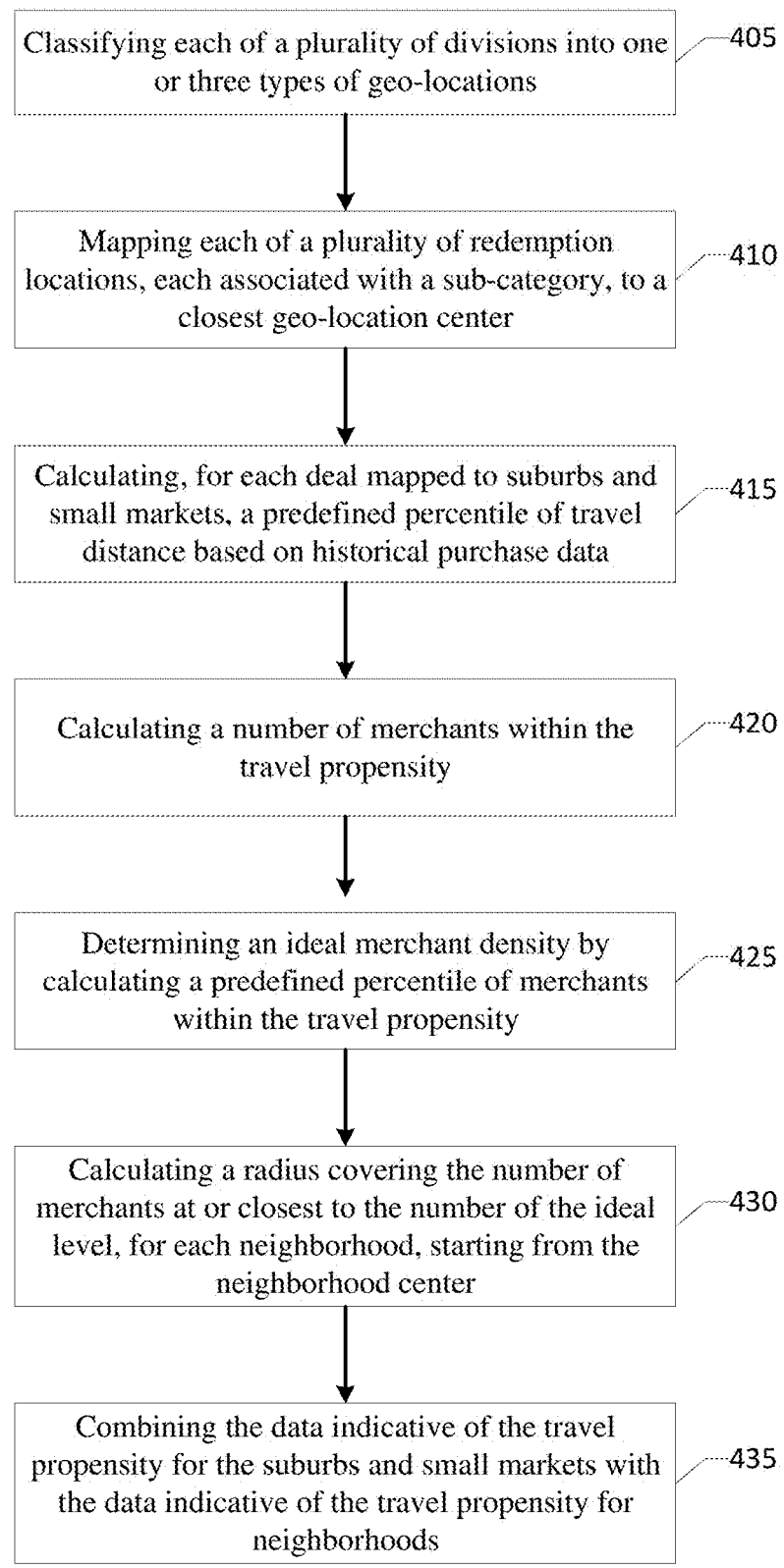
Figure 4B:
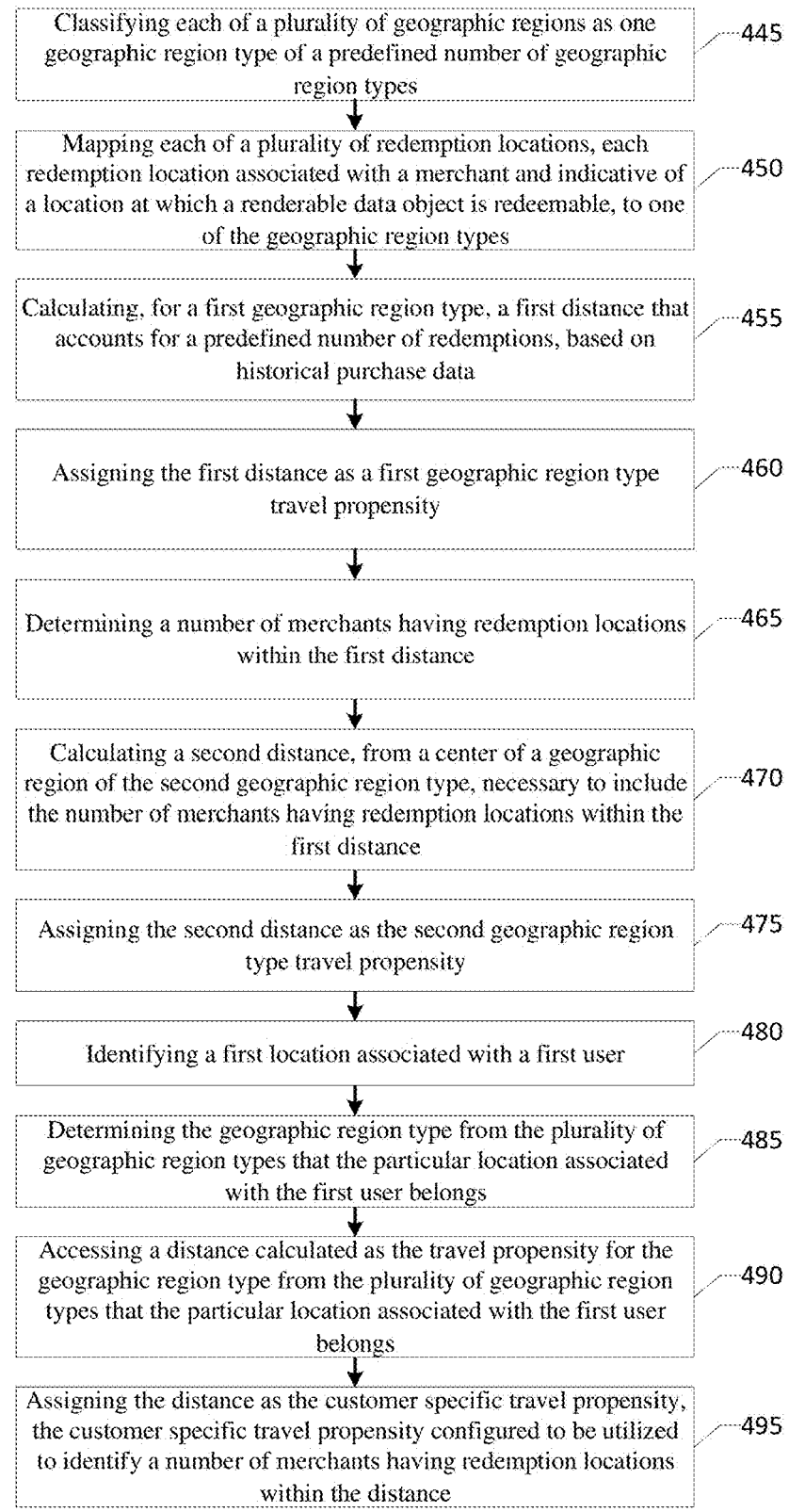
Figure 6:
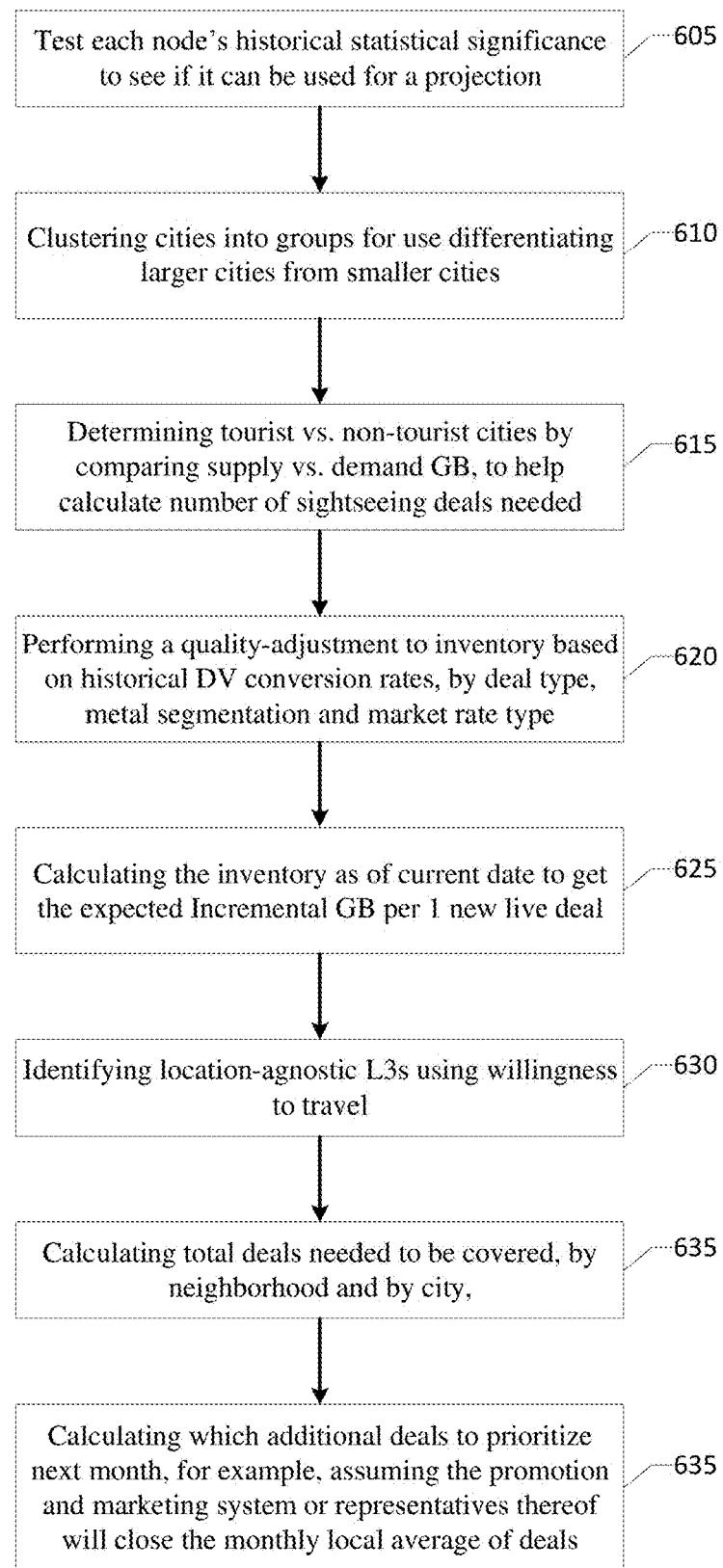
Figure 7A:
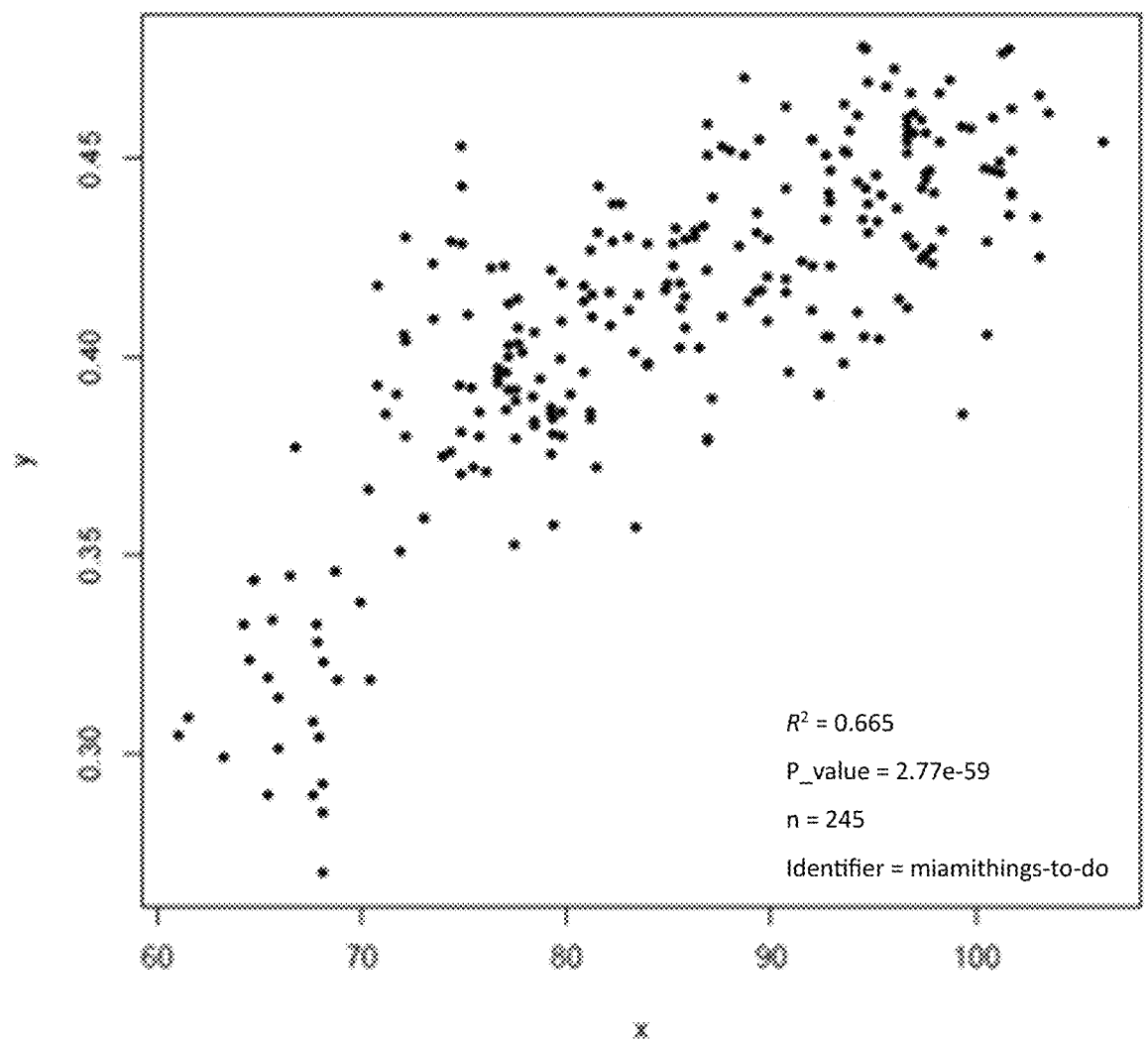
Figure 7B:
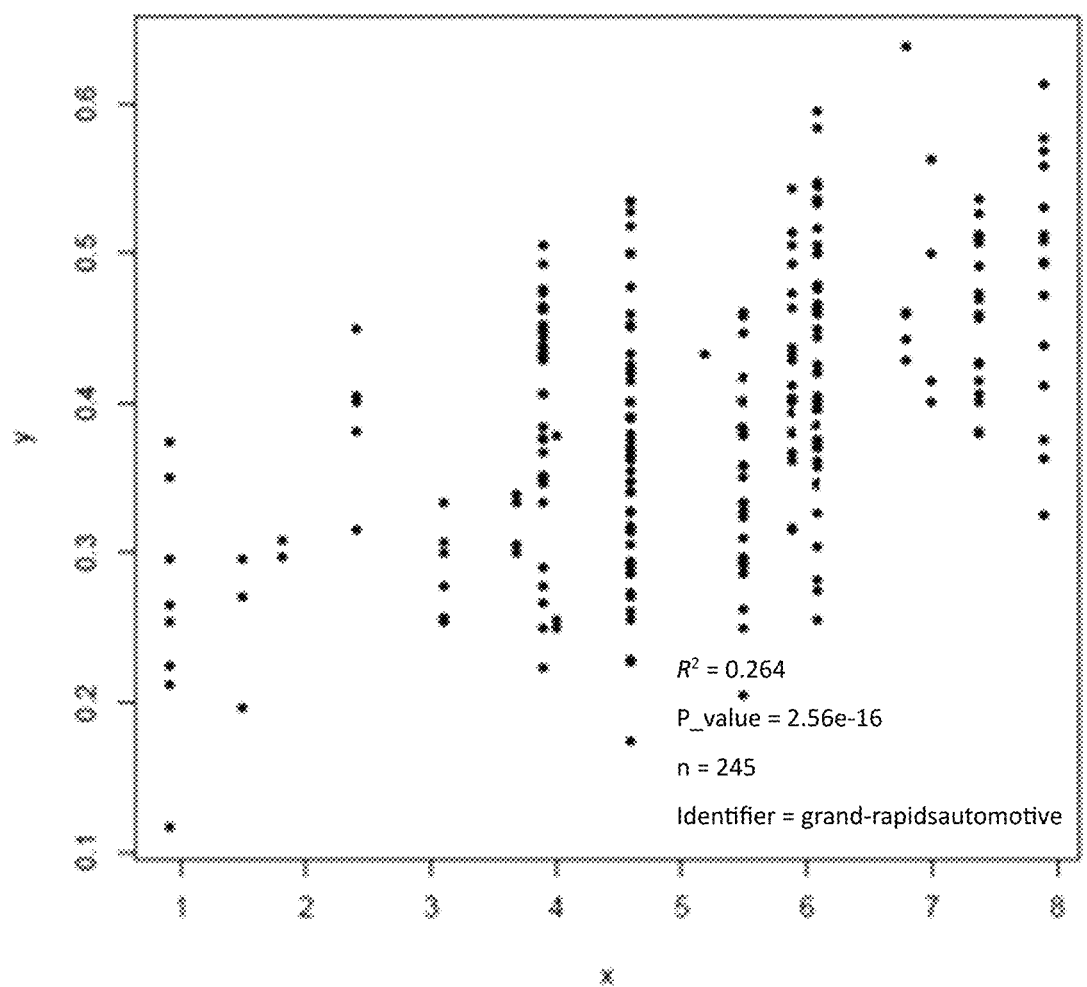
Figure 7C:
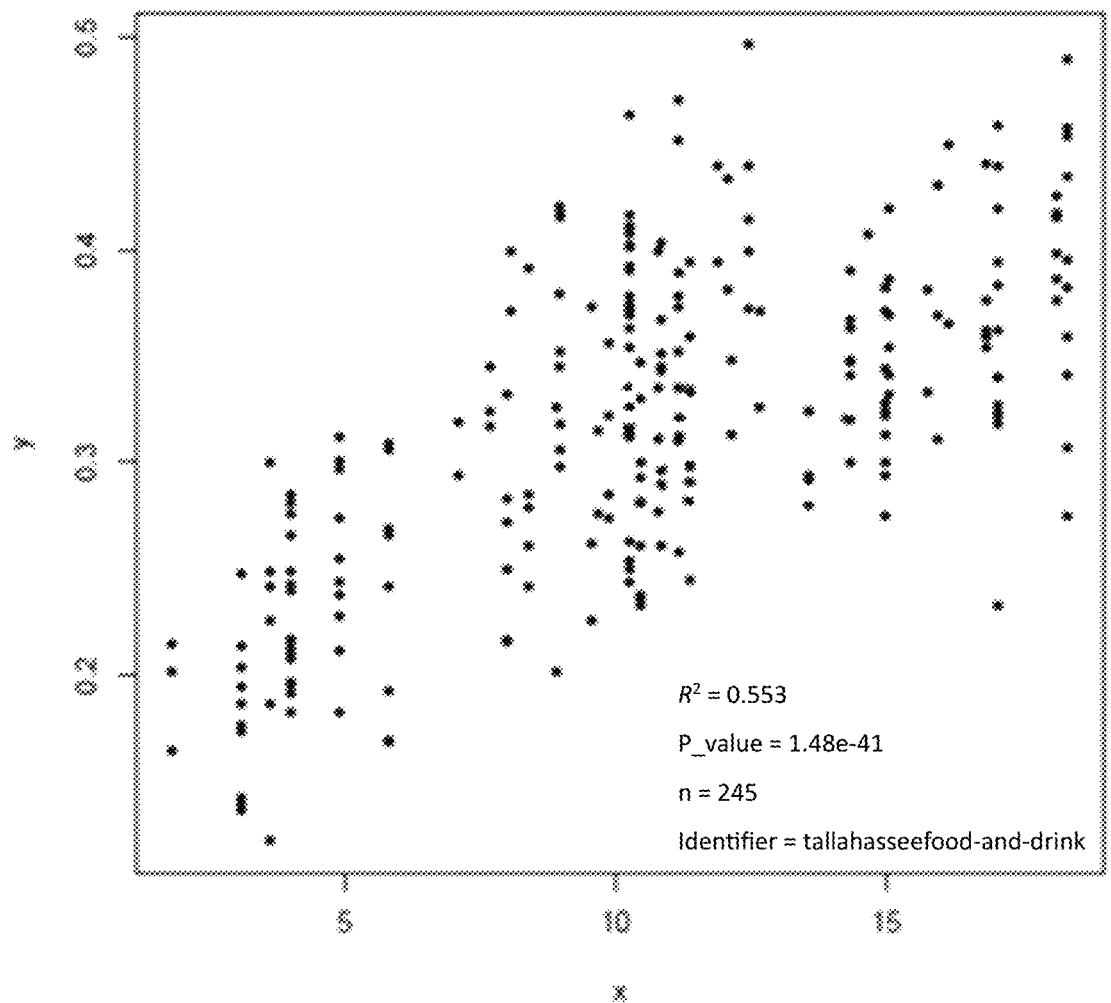
Figure 7D:
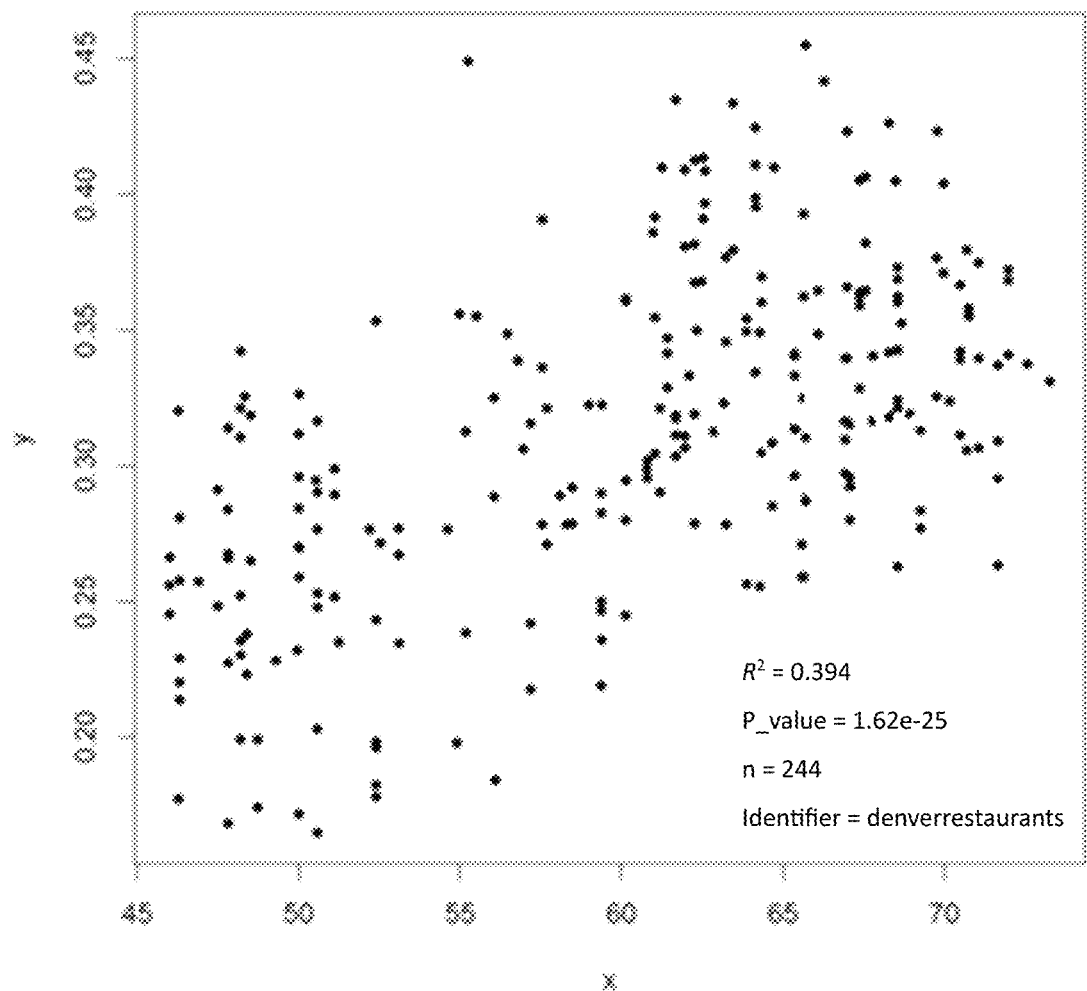

Having thus described certain example embodiments of the present disclosure in general terms, reference will now be made to the accompanying drawings, which are not necessarily drawn to scale, and wherein:

FIG. 1 illustrates an example system within which embodiments of the present invention may operate;

FIG. 2 illustrates a block diagram showing an example device for implementing a system using special-purpose circuitry in accordance with some exemplary embodiments of the present invention;

FIG. 3 illustrates a flow diagram depicting an exemplary method in accordance with some exemplary embodiments of the present invention;

FIGS. 4A and 4B each illustrate a flow diagram depicting an exemplary method for determining travel propensity in accordance with some exemplary embodiments of the present invention;

FIGS. 5A-5D show example visual displays exemplifying a visual of the results of a travel propensity determination process, in accordance with some exemplary embodiments of the present invention;

FIG. 6 illustrates a flow diagram depicting an exemplary method in accordance with some exemplary embodiments of the present invention; and FIGS. 7A-7D show example curves, in accordance with some exemplary embodiments of the present invention.

DETAILED DESCRIPTION

Various embodiments of the present invention are directed to improved apparatuses, methods, and computer readable media for determining, calculating, or otherwise gauging the health, quality, or general adequacy of inventory.

Overview

Conventional methods for determining, calculating, or otherwise gauging the health, quality, or general adequacy of inventory fail to accurately provide a metric that correlates with business output. Conventional systems that simply count or determine a quantity of (e.g., how much) inventory is available, even if by location or category, are conceptually distinct and, as stated above, have proved to fail in providing an acceptable or useful metric by which a correlation may be made with, for example, the performance of the business. Even while continuing to improve and refined conventional methods, correlation to the performance of the business is unimproved.

Various embodiments of the present invention are directed to improved apparatuses, methods, and computer readable media for determining, calculating, or otherwise gauging the health, quality, or general adequacy of inventory. Example embodiments comprise generating a customer supply index (CSI) by analyzing supply from a customer perspective. In particular, in some embodiments, on an individual customer by customer basis, all available or relevant promotions are first identified, then the contribution of each is determined. Contribution is customer specific or, in some embodiments, customer location specific, and may include weighting the contribution of each as a function of, for example, a merchant quality score of the merchant providing the promotion, an age of the promotion, or the like. From there, a summed total is determined and compared against a coverage cap, the coverage cap indicative of a predetermined threshold indicative of a number of promotions, that if met, represents saturation (e.g., additional supply would not result in a measureable benefit greater than a predefined threshold).

The results, having been performed on each of a plurality of customers, are then aggregated into the customer supply index.

The use of a CSI is different than and a change from conventional models and/or traditional processes in which systems simply viewed and/or measured supply (i.e., inventory) by total volume from the perspective of a geographic region (e.g., a neighborhood, city, zip code, or the like). In those systems, customer locations are not considered, as the systems do not have a process for capturing that information, integrating that information, or utilizing that information. Ignoring customer locations, such as where they live, work, or exist in real-time, and simply adding up the inventory that is able to be offered, ignores any relevance to the specific customers.

In contrast, here, a system is configured to view, measure, analyze, or more generally utilize a process that views the adequacy or "health" of supply from the perspective of a customer or customers, utilizing customer specific information such as location, by first considering individual customer locations, and ultimate considering customer density, thus enabling a determination of whether a particular increase in supply (e.g., an additional promotion in certain category offered by a merchant in a particular location) is beneficial from the perspective of an individual customer (e.g., does the increase in supply make the experience better for customers in the areas that need it the most). Such a determination may inform the decision making process as the business seeks new opportunities (e.g., which new merchants, new promotions, deals, offers, etc., and where).

For this to work best, every customer or near every customer must be considered, requiring a very large amount of data and processing. To aid in processing, customers may be clustered (e.g., GPS coordinates "rounded" or the like), reducing necessary computational power, and thus allowing faster (e.g., real-time) results to be calculated.

Furthermore, given the discreet calculations, the solution solves what has been identified a parallizable problem. For example, the system may be implemented via a distributed processing environment. It should also be appreciated that because a plurality of weighting factors are considered, individual components, calculations, or algorithms can be updated, added, or removed individually, reducing downtime and allowing iterative improvement as those individual components are improved.

The output, the aggregation of the above-described calculation for each of a plurality of customers creating a "customer supply index" defining metrics indicative of the health of the supply for each of one or more geographic regions, may be provided in real-time (e.g., instantaneous, based on real-time locations of customers, or the like) or forward looking (e.g., using user profile identifying various home/work locations).

The output, an aggregate location specific category-based, sector-based or industry-based supply index, similar to financial indices such as NASDAQ or S&P 500, may be temporal in nature enabling comparison to previous index scores for example, related to a particular category, sector, industry, etc., to current index scores allowing further analyzation and potentially allowing an understanding as to the cause(s) behind changes to the index scores.

Definitions

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As used herein, the terms "data," "content," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to the another computing device or may be sent indirectly via one or more intermediary computing devices, such as, for example, one or more servers, relays, routers, network access points, base stations, hosts, and/or the like.

As used herein, the term "promotion and marketing service" may include a service that is accessible via one or more computing devices and that is operable to provide promotion and/or marketing services on behalf of one or more providers that are offering one or more instruments that are redeemable for goods, services, experiences and/or the like. In some examples, the promotion and marketing service may take the form of a redemption authority, a payment processor, a rewards provider, an entity in a financial network, a promoter, an agent and/or the like. As such, the service is, in some example embodiments, configured to present one or more promotions via one or more impressions, accept payments for promotions from customers, issue instruments upon acceptance of an offer, participate in redemption, generate rewards, provide a point of sale device or service, issue payments to providers and/or or otherwise participate in the exchange of goods, services or experiences for currency, value and/or the like. The service is also, in some example embodiments, configured to offer merchant services such as promotion building (e.g., assisting merchants with selecting parameters for newly created promotions), promotion counseling (e.g., offering information to merchants to assist with using promotions as marketing), promotion analytics (e.g., offering information to merchants to provide data and analysis regarding the costs and return-on-investment associated with offering promotions), and the like.

As used herein, the terms "provider" and "merchant" may be used interchangeably and may include, but are not limited to, a business owner, consigner, shopkeeper, tradesperson, vendor, operator, entrepreneur, agent, dealer, organization or the like that is in the business of a providing a good, service or experience to a customer, facilitating the provision of a good, service or experience to a customer and/or otherwise operating in the stream of commerce. The "provider" or "merchant" need not actually market a product or service via the promotion and marketing service, as some merchants or providers may utilize the promotion and marketing service only for the purpose of gathering marketing information, demographic information, or the like.

As used herein, the term "customer" should be understood to refer to a recipient of goods, services, promotions, media, or the like provided by the promotion and marketing service and/or a merchant. Customers may include, without limitation, individuals, groups of individuals, corporations, other merchants, and the like.

As used herein, the term "promotion" may include, but is not limited to, any type of offered, presented or otherwise indicated reward, discount, coupon, credit, deal, incentive, discount, media or the like that is indicative of a promotional value or the like that upon purchase or acceptance results in the issuance of an instrument that may be used toward at least a portion of the purchase of particular goods, services and/or experiences defined by the promotion. Promotions may have different values in different contexts. For example, a promotion may have a first value associated with the cost paid by a customer, known as an "accepted value." When redeemed, the promotion may be used to purchase a "promotional value" representing the retail price of the goods. The promotion may also have a "residual value," reflecting the remaining value of the promotion after expiration. Although customers may be primarily focused on the accepted and promotional value of the promotion, a promotion may also have additional associated values. For example, a "cost value" may represent the cost to the merchant to offer the promotion via the promotion and marketing service, where the promotion and marketing service receives the cost value for each promotion sold to a customer. The promotion may also include a "return on investment" value, representing a quantified expected return on investment to the merchant for each promotion sold.

For example, consider a promotion offered by the promotion and marketing service for a $50 meal promotion for $25 at a particular restaurant. In this example, $25 would be the accepted value charged to the customer. The customer would then be able to redeem the promotion at the restaurant for $50 applied toward their meal check. This $50 would be the promotional value of the promotion. If the customer did not use the promotion before expiration, the customer might be able to obtain a refund of $22.50, representing a 10% fee to recoup transaction costs for the merchant and/or promotion and marketing service. This $22.50 would be the residual value of the promotion. If the promotion and marketing service charged the merchant $3.00 to offer the promotion, the $3.00 fee would be the "cost value." The "return on investment" value of the promotion might be dynamically calculated by the promotion and marketing service based on the expected repeat business generated by the marketing of the promotion, the particular location, the demographics of the customer, and the like. For example, the return on investment value might be $10.00, reflecting the long term additional profit expected by the merchant as a result of bringing in a new customer through use of a promotion.

Promotions may be provided to customers and redeemed via the use of an "instrument." Instruments may represent and embody the terms of the promotion from which the instrument resulted. For example, instruments may include, but are not limited to, any type of physical token (e.g., magnetic strip cards or printed barcodes), virtual account balance (e.g., a promotion being associated with a particular user account on a merchant website), secret code (e.g., a character string that can be entered on a merchant website or point-of-sale), tender, electronic certificate, medium of exchange, voucher, or the like which may be used in a transaction for at least a portion of the purchase, acquisition, procurement, consumption or the like of goods, services and/or experiences as defined by the terms of the promotion.

In some examples, the instrument may take the form of tender that has a given value that is exchangeable for goods, services and/or experiences and/or a reduction in a purchase price of a particular good, service or experience. In some examples, the instrument may have multiple values, such as accepted value, a promotional value and/or a residual value. For example, using the aforementioned restaurant as the example provider, an electronic indication in a mobile application that shows $50 of value to be used as payment for a meal check at the restaurant. In some examples, the accepted value of the instrument is defined by the value exchanged for the instrument. In some examples, the promotional value is defined by the promotion from which the instrument resulted and is the value of the instrument beyond the accepted value. In some examples, the residual value is the value after redemption, the value after the expiry or other violation of a redemption parameter, the return or exchange value of the instrument and/or the like.

As used herein, the term "location data" refers to electronic information indicating a particular location. Location data may be associated with a customer, a merchant, or any other entity capable of interaction with the promotion and marketing service. For example, in some embodiments location data is provided by a location services module of a customer mobile device. In some embodiments, location data may be provided by a merchant indicating the location of customers within their retail location. In some embodiments, location data may be provided by merchants to indicate the current location of the merchant (e.g., a food truck or delivery service). It should be appreciated that location data may be provided by various systems capable of determining location information, including, but not limited to, global positioning service receivers, indoor navigation systems, cellular tower triangulation techniques, video surveillance systems, or radio frequency identification (RFID) location systems.

It should be appreciated that the terms "mobile device" and "mobile terminal" refer to handheld computing devices such as cellular phones, personal digital assistants (PDAs), smartphones, and other portable devices that are capable of communicating via a wireless network. Such devices may include internal mechanisms for determining a location of the mobile device (e.g., global positioning system (GPS) receivers, cellular tower triangulation systems, or the like) or external mechanisms for determining the location of the mobile device (e.g., a barcode or other machine-readable code that can be scanned to detect the mobile device, a unique device identifier that is broadcast to a local network device or beacon to report that the device is in proximity, or the like). It should be understood that, while many of the embodiments described herein relate to mobile devices that include internal positioning mechanisms and which directly report the location of the mobile device, some embodiments of the instant invention also include mechanisms that do not rely on the mobile device itself to report the location, and as such these embodiments may be employed in any scenario where it is possible to identify the location of one or more mobile devices.

It should be appreciated that the term "index" may be defined as a value indicating a health, quality, or general adequacy of available supply or inventory. Using various embodiments described herein, an index may indicated the value of the health, quality, or general adequacy of available supply or inventory at one or both of a customer level (e.g., from an individual customer level, how healthy is the inventory available to them) or a market level (e.g., how healthy is the supply available at any given location, within any geographic region, or the like). The index may be stored, for example, in a database or the like, on a customer by customer basis, and in some embodiments, each customer may be associated with a stored index value for each of a plurality of categories (e.g., L2 in the promotion and marketing perspective such as health and beauty, food and dining, etc.) or sub-categories (e.g., 'L3' in the promotion and marketing perspective such as nail salons, pizza, etc.).

It should be appreciated that the term "travel propensity" may be defined as the area to which and/or the distance a customer is willing to travel to purchase a renderable data object. In some embodiments, travel propensity is a binary function. That is, a renderable data object (e.g., a single promotion, deal, offer, etc.) is either in the travel propensity for a customer or out.

It should be appreciated that the term "coverage cap" refers the number of renderable data objects (e.g., promotions, deals, etc.) needed in a particular geographic region (e.g., a city, a neighborhood, or any geographic region) to be "covered", defined by, for example, a number at which providing a single additional renderable data object results in a measureable and/or objective improvement to, for example a measurable metric (e.g., conversion rate or the like) of less than a pre-defined threshold value (e.g., 1%, 2%, etc.) of the metric.

System Architecture

Methods, apparatuses, and computer program products of the present invention may be embodied by any of a variety of devices. For example, the method, apparatus, and computer program product of an example embodiment may be embodied by a networked device, such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile terminals, such as a portable digital assistant (PDA), mobile telephone, smartphone, laptop computer, tablet computer, or any combination of the aforementioned devices.

In this regard, FIG. 1 discloses an example computing system within which embodiments of the present invention may operate. Merchants may access a promotion and marketing service 102 via a network 112 (e.g., the Internet, or the like) using computer devices 108A through 108N and 110A through 110N, respectively (e.g., one or more customer devices 108A-108N or one or more merchant devices 110A-110N). The promotion and marketing service 102 may function to detect events based on customer location information as described herein and below. Moreover, the promotion and marketing service 102 may comprise a server 104 in communication with a database 106.

The server 104 may be embodied as a computer or computers as known in the art. The server 104 may provide for receiving of electronic data from various sources, including but not necessarily limited to the customer devices 108A-108N and the merchant devices 110A-110N. For example, the server 104 may be operable to receive and process clickstream data provided by the customer devices 108 and/or the merchant devices 110. The server 104 may also facilitate e-commerce transactions based on transaction data provided by the customer devices 108 and/or the merchant devices 110. The server 104 may facilitate the generation and providing of various electronic marketing communications and marketing materials based on the received electronic marketing information.

The database 106 may be embodied as a data storage device such as a Network Attached Storage (NAS) device or devices, or as a separate database server or servers. The database 106 includes information accessed and stored by the server 104 to facilitate the operations of the promotion and marketing service 102. For example, the database 106 may include, without limitation, user account credentials for system administrators, merchants, and customers, data indicating the products and promotions offered by the promotion and marketing service, electronic marketing information, analytics, reports, financial data, and/or the like.

The customer devices 108A-108N may be any computing device as known in the art and operated by a customer. Electronic data received by the server 104 from the customer devices 108A-108N may be provided in various forms and via various methods. For example, the customer devices 108A-108N may include desktop computers, laptop computers, smartphones, netbooks, tablet computers, wearables, and the like. The information may be provided through various sources on these customer devices.

In embodiments where a customer device 108 is a mobile device, such as a smart phone or tablet, the customer device 108 may execute an "app" to interact with the promotion and marketing service 102. Such apps are typically designed to execute on mobile devices, such as tablets or smartphones. For example, an app may be provided that executes on mobile device operating systems such as Apple Inc.'s iOS®, Google Inc.'s Android®, or Microsoft Inc.'s Windows 8® and Windows 10®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications in a manner that allows for improved interactions between apps while also preserving the privacy and security of customers. In some embodiments, a mobile operating system may also provide for improved communication interfaces for interacting with external devices (e.g., home automation systems, indoor navigation systems, and the like). Communication with hardware and software modules executing outside of the app is typically provided via application programming interfaces (APIs) provided by the mobile device operating system.

The promotion and marketing service 102 may leverage the application framework offered by the mobile operating system to allow customers to designate which information is provided to the app and which may then be provided to the promotion and marketing service 102. In some embodiments, customers may "opt in" to provide particular data to the promotion and marketing service 102 in exchange for a benefit, such as improved relevancy of marketing communications offered to the user. In some embodiments, the customer may be provided with privacy information and other terms and conditions related to the information provided to the promotion and marketing service 102 during installation or use of the app. Once the customer provides access to a particular feature of the mobile device, information derived from that feature may be provided to the promotion and marketing service 102 to improve the quality of the customer's interactions with the promotion and marketing service.

For example, the customer may indicate that they wish to provide location information to the app from location services circuitry included in their mobile device. Providing this information to the promotion and marketing service 102 may enable the promotion and marketing service 102 to offer promotions to the customer that are relevant to the particular location of the customer (e.g., by providing promotions for merchants proximate to the customer's current location). It should be appreciated that the various mobile device operating systems may provide the ability to regulate the information provided to the app associated with the promotion and marketing service 102. For example, the customer may decide at a later point to disable the ability of the app to access the location services circuitry, thus limiting the access of the customer's location information to the promotion and marketing service 102.

As noted above, some wireless carriers may also provide customers with the ability to "opt in" to allowing certain application developers to request mobile device location information directly from the wireless carrier (e.g., a location derived from which cellular tower or towers with which the mobile device is in communication) without the need to directly contact the mobile terminal. Such embodiments may advantageously reduce the amount of mobile device battery life required to receive location-based notifications while still providing benefits derived from the ability to determine when the customer is at a particular event as described herein.

Various other types of information may also be provided in conjunction with an app executing on the customer's mobile device. For example, if the mobile device includes a social networking feature, the customer may enable the app to provide updates to the customer's social network to notify friends of a particularly interesting promotion or to indicate that the customer has been detected at a particular event. It should be appreciated that the use of mobile technology and associated app frameworks may provide for particularly unique and beneficial uses of the promotion and marketing service through leveraging the functionality offered by the various mobile operating systems.

Additionally or alternatively, the customer device 108 may interact through the promotion and marketing service 102 via a web browser. As yet another example, the customer device 108 may include various hardware or firmware designed to interface with the promotion and marketing service 102 (e.g., where the customer device 108 is a purpose-built device offered for the primary purpose of communicating with the promotion and marketing service 102, such as a store kiosk).

The merchant devices 110A-110N may be any computing device as known in the art and operated by a merchant. For example, the merchant devices 110A-110N may include a merchant point-of-sale, a merchant local marketing device, a merchant e-commerce server, a merchant inventory system, or a computing device accessing a web site designed to provide merchant access (e.g., by accessing a web page via a browser using a set of merchant account credentials). The merchant devices 110A-110N may also be mobile devices as described above with respect to the customer devices 108A-108N.

Electronic data received by the promotion and marketing service 102 from the merchant devices 110A-110N may also be provided in various forms and via various methods. For example, the merchant devices 110A-110N may provide real-time transaction and/or inventory information as purchases are made from the merchant. In other embodiments, the merchant devices 110A-110N may be employed to provide information to the promotion and marketing service 102 to enable the promotion and marketing service 102 to generate promotions or other marketing information to be provided to customers.

Example Apparatuses for Implementing
Embodiments of the Present Invention

The server 104 may be embodied by one or more computing systems, such as apparatus 200 shown in FIG. 2. As illustrated in FIG. 2, the apparatus 200 may include a processor 202, a memory 204, input/output circuitry 206, communications circuitry 208, location services circuitry 210, travel propensity circuitry 212, coverage cap circuitry 214, and aggregation circuitry 216. The apparatus 200 may be configured to execute the operations described above with respect to FIG. 1 and below with respect to FIGS. 4-10. Although these components 202-216 are described with respect to functional limitations, it should be understood that the particular implementations necessarily include the use of particular hardware. It should also be understood that certain of these components 202-216 may include similar or common hardware. For example, two sets of circuitry may both leverage use of the same processor, network interface, storage medium, or the like to perform their associated functions, such that duplicate hardware is not required for each set of circuitry. The use of the term "circuitry" as used herein with respect to components of the apparatus should therefore be understood to include particular hardware configured to perform the functions associated with the particular circuitry as described herein.

The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements of the apparatus 200 may provide or supplement the functionality of particular circuitry. For example, the processor 202 may provide processing functionality, the memory 204 may provide storage functionality, the communications circuitry 208 may provide network interface functionality, and the like.

In some embodiments, the processor 202 (and/or co-processor or any other processing circuitry assisting or otherwise associated with the processor) may be in communication with the memory 204 via a bus for passing information among components of the apparatus. The memory 204 may be non-transitory and may include, for example, one or more volatile and/or non-volatile memories. In other words, for example, the memory may be an electronic storage device (e.g., a computer readable storage medium). The memory 204 may be configured to store information, data, content, applications, instructions, or the like, for enabling the apparatus to carry out various functions in accordance with example embodiments of the present invention.

The processor 202 may be embodied in a number of different ways and may, for example, include one or more processing devices configured to perform independently. Additionally or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In an example embodiment, the processor 202 may be configured to execute instructions stored in the memory 204 or otherwise accessible to the processor. Alternatively or additionally, the processor may be configured to execute hard-coded functionality. As such, whether configured by hardware or software methods, or by a combination thereof, the processor may represent an entity (e.g., physically embodied in circuitry) capable of performing operations according to an embodiment of the present invention while configured accordingly. Alternatively, as another example, when the processor is embodied as an executor of software instructions, the instructions may specifically configure the processor to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display and may comprise a web user interface, a mobile application, a client device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communication interface may include the circuitry for interacting with the antenna(s) to cause transmission of signals via the antenna(s) or to handle receipt of signals received via the antenna(s).

The location services circuitry 210 includes hardware configured to receive or determine a location of a plurality of mobile devices. The location services circuitry 210 may include an interface for communicating with the mobile devices over a network. Such an interface may be provided by the communications circuitry 208. The location services circuitry 210 may include a network interface that receives location information reported by the mobile device via an application and location services module located on the mobile device itself. Additionally or alternatively, the location services circuitry 210 may include an interface to a wireless carrier or other third party system capable of providing location information for one or more mobile terminals. Additionally or alternatively, the location services circuitry 210 may also include hardware configured to determine the location of the one or more mobile terminals based on received data. For example, the location services circuitry 210 may include hardware configured to determine the location of the mobile terminal based on data indicating which wireless stations (e.g., wireless access points or cellular towers) with which the mobile terminal is in communication. Upon receiving a location or locations of a mobile terminal or terminals, the location services circuitry 210 may notify the event detection circuitry 212 of the location. This notification may occur via an application programming interface (API), shared memory, bus, or the like. In some embodiments, the location services circuitry 210 may be implemented as a component of the event detection circuitry 212, and the location information may be communicated internally to the consolidated module. The location services circuitry 210 may include a separate processor to receive and/or determine the location of mobile terminals. The location services circuitry 210 is therefore implemented using hardware components of the apparatus configured by either hardware or software for implementing these planned functions.

The travel propensity circuitry 212 includes hardware configured to identifying an area to which and/or the distance a customer is willing to travel to purchase a renderable data object. To this end, the travel propensity circuitry 212 may identify a portion of a total supply that is relevant and/or available, for example, to the particular customer at the particular location. This may include identifying a geographic area or range of coordinate values that correspond to a geographic region comprising a plurality, or in some embodiments, pre-defined number of promotions, merchant devices, such that Point-of-Sale type devices, mobile devices used by merchants, or the like that are detected within the geographic area or range of coordinate values. The location services circuitry 210 may provide the travel propensity circuitry 212 with locations of promotions and/or mobile terminals in order to determine if those mobile terminals are within the travel propensity. Upon detection of a mobile terminal within the travel propensity, the travel propensity circuitry 212 may provide an indication, for example, to the coverage cap circuitry 216, so that the coverage cap circuitry 216 may take appropriate action. The travel propensity circuitry 212 includes processing circuitry, such as the processor 202, configured to perform these functions. The travel propensity circuitry 212 also includes data storage, such as the memory 204, to store and access relevant data including storage of coordinates related to particular geographic regions and associated classifications, and the like. The travel propensity circuitry 212 is therefore implemented using hardware components of the apparatus configured by either hardware or software for implementing these planned functions.

The coverage cap circuitry 214 includes hardware configured to access, identify or otherwise determine a coverage cap indicative of a predetermined threshold indicative of a number of promotions, that if met, represents saturation (e.g., additional supply would not result in a measureable benefit greater than a predefined threshold). The coverage cap generation circuitry 214 may further be configured to determine a capped total, for example, by performing a comparison between a summed total, as described below, and the coverage cap. The system is configured to determine capped score by comparing coverage cap to summed total, and if coverage cap is less than summed total, capped score is set equal to coverage cap, whereas if coverage cap is greater than summed total, capped score is set to the summed total. It should also be appreciated that, in some embodiments, the coverage cap circuitry 214 may include a separate processor or the like to determine the capped total. The coverage cap circuitry 214 may also include a storage mechanism, such as the memory 204, for storing coverage map tables and/or graphs that indicate or otherwise identify coverage caps. The hot zone generation circuitry 214 is therefore implemented using hardware components of the apparatus configured by either hardware or software for implementing these planned functions.

The aggregation circuitry 216 includes hardware configured to aggregate, for each of the plurality of customers, the capped scores. In some embodiments, aggregation is performed on a category by category basis. The aggregation circuitry 216 may include processing circuitry, such as the processor 202, configured to perform these functions. It should also be appreciated that, in some embodiments, the application circuitry 216 may include a separate processor, networking circuitry, protocols, and messaging techniques to implement a variety of functions relating to the processes described herein. The aggregation circuitry 216 is therefore implemented using hardware components of the apparatus configured by either hardware or software for implementing these planned functions.

As will be appreciated, any such computer program instructions and/or other type of code may be loaded onto a computer, processor or other programmable apparatus's circuitry to produce a machine, such that the computer, processor other programmable circuitry that execute the code on the machine create the means for implementing various functions, including those described herein.

It is also noted that all or some of the information presented by example displays described herein can be based on data that is received, generated and/or maintained by one or more components of apparatus 200. In some embodiments, one or more external systems (such as a remote cloud computing and/or data storage system) may also be leveraged to provide at least some of the functionality discussed herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Exemplary Processes for Implementing a Customer Supply Indexing System

FIGS. 3 and 4 illustrate flow diagrams depicting processes for implementing the systems described above with respect to FIGS. 1 and 2 to determine, calculate, or otherwise gauge the health, quality, or general adequacy of inventory. FIG. 3 illustrates a flow diagram depicting an example of a process 300 for generating a supply index indicative of a quality (e.g., health, adequacy, or the like) of supply (e.g., available inventory) by calculating and aggregating a supply metric calculated from a perspective of each of a plurality of individual customers, each of the plurality of individual customers associated with a user location, for the purpose of identifying those locations where an increase in supply would most positively impact "value" to customers, in accordance with some exemplary embodiments of the present invention. The process 300 illustrates how location data can be received from a plurality of mobile devices and used to identify a user location. The process 300 may be performed by elements of an apparatus 200, such as location services circuitry 210 acting in concert with travel propensity circuitry 212, the coverage cap circuitry 214, and aggregation circuitry 216 as described above with respect to FIG. 2.

In some embodiments, improved apparatuses, methods, and computer readable media may be configured for monitoring and/or detecting and filtering location service data to identify where a mobile device is located. Additionally or alternatively, customer locations may be accessed from user profiles or a system that has previously identified various time-related customer locations (e.g., work, home, etc.)

As such, as shown in block 305 of FIG. 3, an apparatus, such as apparatus 200, may be configured for identifying a first location of a first user. Before, after, or concurrently, as shown in block 310 of FIG. 3, an apparatus, such as apparatus 200, may be configured for receiving location data associated with at least one of a plurality of mobile devices. As described above, the device locations may be received via a location service element, which receives a mobile device location directly or indirectly from the mobile device. In some embodiments, each of the mobile devices and/or merchant devices may report location information to a remote server at certain intervals, or on demand. And while it is generally understood that mobile devices in use by customers move frequently, many merchants may also be capable and of changing locations. For example, food trucks, merchandise tents, or the like often locate and/or relocate near particular merchants (e.g., venues, concert halls, stadiums, or the like) at particular times for particular time periods.

Mobile devices may report a location every 5 minutes, every 10 minutes, or every hour. In some embodiments, location reporting may be based upon execution of a particular application, such as a mobile application provided by an application developer. This application may access location information stored on the mobile device or utilize location services circuitry (e.g., a GPS receiver) on the mobile device to determine a location and report that location to a remote server associated with the application. The ability of the application to perform this functionality may be as a result of a user of the mobile device "opting in" to enable access to the location information by the mobile device.

Additionally or alternatively, location may be accessed or otherwise determined from a user profile. For example, a user may provide input explicitly defining a location (e.g., the location to which they would prefer the system to identify relevant content, a home, a work location, etc.) and the system may store the information defining the location, the location, or the like. In some embodiments, location may be inferred by any number of known location determination processes and stored in a user profile.

In some embodiments, the location determined by the system may be a function or otherwise dependent on the particular use case of the ultimate calculation. If a real-time or instantaneous metric is requested, a real-time or instantaneous location may be detected or determined, whereas if a more holistic view of supply is requested, the location from a user profile may be utilized.

In any event, the process proceeds after determining a location of the customer.

As shown in block 315 of FIG. 3, an apparatus, such as apparatus 200, may be configured for identifying at least a portion of each of one or more renderable data objects associated with and/or available to a customer located at the first location. In some embodiments, the apparatus is configured to identify a portion of a total supply that is relevant to, associated with, or otherwise accessible or available to a user located at the first location. In some embodiments, the apparatus may be configured for identifying a portion of a total supply that is relevant and/or available, for example, to the particular customer at the particular location. The total supply may be comprised of all renderable data objects available through the promotion and marketing system. The portion may be those renderable data objects having a particular characteristic, such as belonging to a particular category, sub-category, or the like.

The output may be a list of renderable data objects. The output may be more refined, such as a list of renderable data objects, each associated with or divided by particular characteristics (e.g., category). In yet another embodiment, the output may be a plurality of lists of renderable data objects, each list associated with a particular characteristic (i.e., a characteristic shared by each renderable data object on the list).

In some embodiments, the output comprises not only a list of renderable data objects, but also an associated value indicative of a weighting. Initially, the value of the weighting may be 1.

In the most general sense, each renderable data object may be associated with a specific location and comprise an area from which customers will travel to redeem the renderable data object. In particular, while customers are willing to travel, that willingness to travel is not unlimited. That is, a customer may be willing to travel to some places and not others. A customer may be less and less likely to travel further and further for a promotion, may be more or less willing to travel in a particular direction, or may be more or less willing to travel to specific locations. That apparatus may be configured for determining a distance between a customer location and each of, or some portion of, merchant locations, the merchant locations being the location at which a renderable data object may be redeemed by the customer. However, in some embodiments, the distance between a customer location and a merchant location is not enough information to make determination of whether a renderable data object is available to the customer.

In this respect, the apparatus may be configured to, in order to identify each renderable data object available to a particular customer location, identify each renderable data object identified as including the customer location is its area from which customers will travel to redeem the renderable data object Travel propensity may be defined as the area to which and/or the distance a customer is willing to travel to purchase a renderable data object (e.g., a promotion or deal of a particular category). In some embodiments, travel propensity may be determined based on a model that captures a predetermined percentage (e.g., 80%) of historic purchases for a specific category in a specific region. In some embodiments, travel propensity is a binary function. That is, a renderable data object (e.g., a single promotion, deal, offer, etc.) is either in the travel propensity for a customer or out.

Travel propensity may be location, category, and/or service specific (e.g., people from the north suburbs may be more willing to travel in general than those in the city, people in the north suburbs may be more willing to travel longer distances (e.g., to the city of Chicago) for food & drink and activities but not anything else). That is, for example, embodiments exist such that the travel propensity for a particular customer or customer location may be a first distance (e.g., 5 miles) in one directions (e.g., north, or more specifically between 90 degrees and 270 degrees, or into a particular neighborhood), and a second distance (e.g., 0, >5 miles, or <5 miles) in a different direction or into a different neighborhood, all varying by category (e.g., 15 miles for museums).

In each of U.S. patent application Ser. No. 14/316,253, filed Mar. 14, 2013, titled "Method, Apparatus, And Computer Program Product For Calculating A Supply Based On Travel Propensity", and U.S. Patent Application No. 62/587,881 entitled "Clustering And Coranking Of Multi-Source Location Data" and filed on Nov. 17, 2017, each of which is hereby incorporated by reference in its entirety, algorithms are provided for determining travel propensity.

One specific embodiment of determining travel propensity is described below, with respect to FIG. 4A, while FIG. 4B, described below, illustrates a more general process of determining travel propensity. FIG. 4A illustrates a flow diagram depicting an example of a process 400 for determining those promotions included with the travel propensity of a user location. The process 400 illustrates how a user location is first classified to a particular type of geo-location and based on the classification, performing a process to determine one or more promotions within the travel propensity of the user location. The process 400 may be performed by elements of an apparatus 200, such as location services circuitry 210 acting in concert with travel propensity circuitry 212, as described above with respect to FIG. 2.

As shown in block 405 of FIG. 4A, an apparatus, such as apparatus 200, may be configured for, first, classifying each of a plurality of divisions into one or a predefined number (e.g., three) types of geo-locations, for example, neighborhood, suburb and small markets—though, as will be described here, small markets may be treated the same or similar to suburbs.

Subsequently, the apparatus may be configured to map all combinations of deal redemption location+L3 (i.e., L3 being a level of a category hierarchy) to the closest geo-location center (e.g., one of the three in above). As such, as shown in block 410 of FIG. 4A, an apparatus, such as apparatus 200, may be configured for mapping each of a plurality of redemption locations, each associated with a sub-category, to a closest geo-location center (e.g., one of the three geo-locations described above (i.e., neighborhood, suburb and small markets)).

Next, for deals mapped to suburbs and small markets, at L3 level, the apparatus may be configured to calculate, for example, the 75th percentile of travel distance based on historical purchase data. Here, the 75th percentile distance is treated as of each suburb's travel propensity (TP). As shown in block 415 of FIG. 4a, an apparatus, such as apparatus 200, may be configured for, for each deal mapped to suburbs and small markets, calculating a predefined percentile of travel distance based on historical purchase data.

Subsequently, for each geo-location+L3, the system may then be configured to calculate the number of merchants (e.g., workable leads) within the TP. As shown in block 420 of FIG. 4A, an apparatus, such as apparatus 200, may be configured for calculating a number of merchants within the travel propensity.

Next, for each L3, the system may then be configured to take, for example, the 75th percentile of merchant numbers within TP. This is the "ideal merchant density" for user to purchase promotions from the promotion and marketing system. As shown in block 425 of FIG. 4a, an apparatus, such as apparatus 200, may be configured for determining an ideal merchant density by calculating a predefined (e.g., 75$^{th}$) percentile of merchants within the travel propensity.

Then, for each neighborhood+L3, starting from the neighborhood center, the system may be configured to calculate the radius covering the number of merchants closest to the "ideal level", and setting this as the TP for the specific neighborhood+L3. As such, as shown in block 430 of FIG. 4A, an apparatus, such as apparatus 200, may be configured for calculating a radius covering the number of merchants at or closest to the number of the ideal level, for each neighborhood, starting from the neighborhood center.

Finally, the system may then be configured to combine data in step 415 (i.e., the TP for suburbs and small markets) and Step 430 (i.e., the TP for neighborhoods). As shown in block 435 of FIG. 4A, an apparatus, such as apparatus 200, may be configured for combining the data indicative of the travel propensity for the suburbs and small markets with the data indicative of the travel propensity for neighborhoods.

Figure 5A:
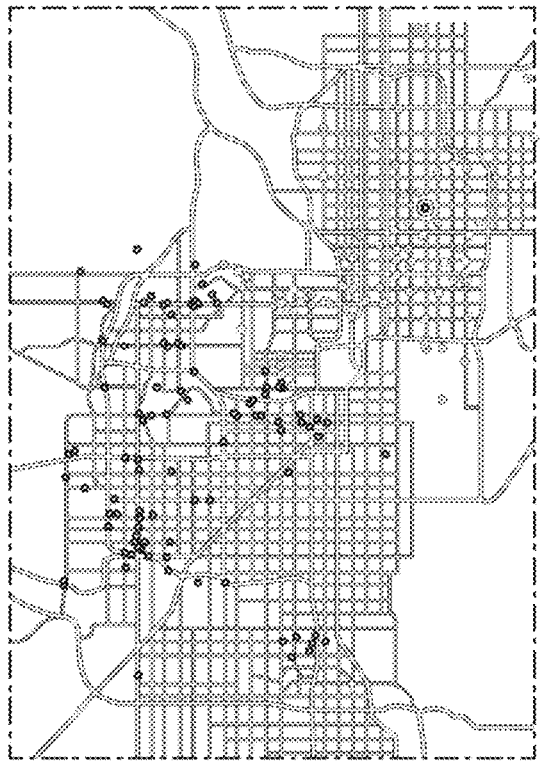
Figure 5B:
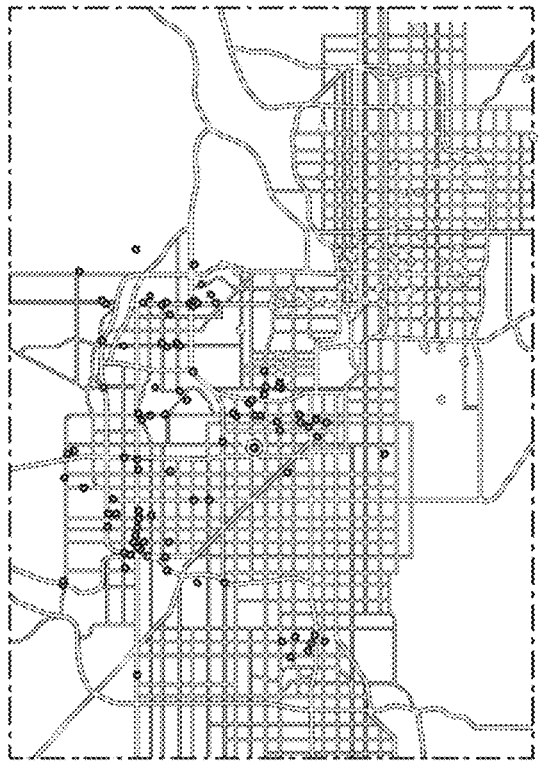
Figure 5C:
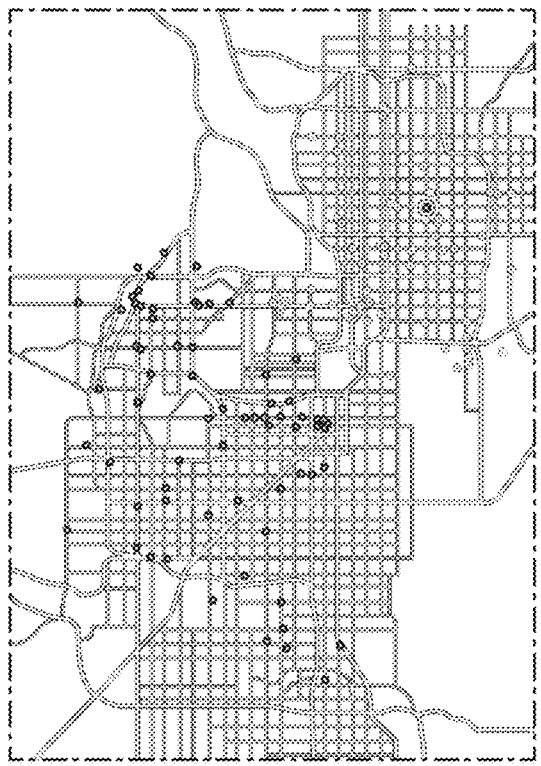
Figure 5D:
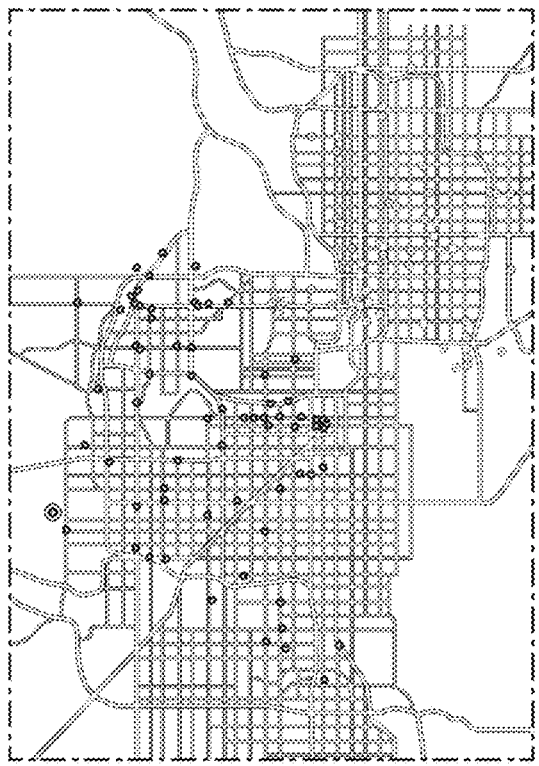

FIGS. 5A-5D shows exemplary travel propensity visualization for users in Phoenix. In particular, FIGS. 5A-5D show how the TP is changing between L3s, and users in different locations. FIG. 5A shows a visualization for a first user for restaurants while FIG. 5B shows a visualization for the first user for hair salons. FIG. 5C shows a visualization for a second user for restaurants, while FIG. 5D shows a visualization of travel propensity for a third user for hair salons. As can be seen, the differing locations of the first user, the second user, and the third user affect those promotions identified within the travel propensity of each individual user. Moreover, as can be seen in FIGS. 5A and 5B, the specific sub-category (e.g., here, restaurants and hair salons) also affect the travel propensity. Specifically, the travel propensity of the first user is larger for hair salons than for restaurants.

Returning now to FIG. 3, as shown in block 320 of FIG. 3, an apparatus, such as apparatus 200, may be configured for associating and/or applying a weight to each of the one or more renderable data objects. In some embodiments, a first weight or a first value to a weight is associated with each of the one or more renderable data objects. The output comprises not only the list of renderable data objects, but also a value indicative of a weighting. In some embodiments, applying at least the first weight to each of at least the portion of each of the one or more renderable data objects comprises identifying a value (e.g., 0.8 or a particular set of GPS coordinates) associated with a first metric (e.g., merchant quality score, or location) associated a characteristic (e.g., merchant/provider/redemption location) of the renderable data object; and multiplying an initial weighting (e.g., 1) by the value resulting in a list of each of at least the portion of each of the one or more renderable data objects and a value indicative of a weighting associated with each of at least the portion of each of the one or more renderable data objects. In some embodiments, the first weighting is indicative of a merchant quality score. That is, each renderable data object is provided by or offered by a particular merchant and each particular merchant is associated with a merchant quality score, the merchant quality score indicative of the quality of the particular merchant. That is, a first renderable data object may be associated with a weight of 0.8 based on the value (e.g., 0.8 or 80%, etc.) of the characteristic (e.g., merchant quality score). In some embodiments, merchant quality rank may be defined as a percentile rank of a merchant across all workable leads within its division based on a raw score.

In U.S. patent application Ser. No. 13/826,866, filed Mar. 14, 2013, titled "Method, Apparatus, And Computer Program Product For Calculating A Provider Quality Score", which is hereby incorporated by reference in its entirety, a promotion and marketing system, method and computer program product are provided for determining a merchant quality score.

As shown in block 325 of FIG. 3, an apparatus, such as apparatus 200, may be configured for applying at least a second weight to each of at least the portion of each of the one or more renderable data objects. In some embodiments, the second weight is a function of a decay rate of a metric (e.g., conversion rate or the like) associated with a characteristic (e.g., category such as health and beauty, food and dining, etc.) of the renderable data object (e.g., a promotion) such that, for example, promotions associated with one category "age" at one rate while promotions associated with a second category "age" at a different rate. The output again comprises not only the list of renderable data objects, but also an adjusted or updated associated value indicative of an updated weighting (e.g., that is, the each of the one or more renderable data objects still only comprises or is associated with a single weighting—but the value may be adjusted, updated, or refined based on a second, third, etc. factor). In some embodiments, the second weighting is indicative of an age of the renderable data object. That is, a decay function that discounts the value (e.g., of the applicable weight) of a renderable data object (e.g., a promotion, deal, or the like) as it ages. For example, a brand new renderable data object may have a 1 or near 1 weight applied whereas a renderable data object that has been available (e.g., on a website associated with the system) for 6 months may have a lower weight (e.g., 0.5) applied.

In some embodiments, the first or second weight may be a function of a category or other characteristic. For example, weights applied to renderable data objects associated with a category such as health and beauty may decay at a slower and/or faster rate than weights associated with renderable data objects associated with a category of food and dining. In other embodiments, the first weighting and/or the second weighting may be indicative of any characteristic, for example, shared by one or more renderable data objects. For example, a weighting may be a function of the quantitative size of the discount (e.g., a high discount versus a low discount) and/or type of deal (e.g., two for 1, 25% off, etc.) associated with the renderable data object.

Again, the output of the weighting step is the list of renderable data objects, each comprising and/or associated with an adjusted or updated associated value indicative of an updated weighting.

As shown in block 330 of FIG. 3, an apparatus, such as apparatus 200, may be configured for calculating a summed total of the associated weights of at least the portion of each of the one or more renderable data objects. That is, the apparatus may be configured for calculating a summed total, for example, of each of the adjusted or updated associated values indicative of the most updated weighting associated with at least the portion each of the plurality of renderable data objects. In some embodiments, values are summed by category, resulting in a number of summed totals for the customer, each indicative of a particular category. In other embodiments, the values may be summed by any characteristic, resulting in some number of summed totals for the customer, each indicative of a specific value of the characteristic.

In those embodiments in which summing is performed by category, the output is a summed total for each category (e.g., 8.5 for a first category, 11.0 for a second category, etc.)

As shown in block 335 of FIG. 3, an apparatus, such as apparatus 200, may be configured for applying a coverage cap. In some embodiments, the apparatus may be configured for applying a coverage cap such that a coverage cap is compared to a summed total. In some embodiments, the system is configured to access a previously calculated coverage cap or calculate the coverage cap, the coverage cap being the number of renderable data objects (e.g., promotions, deals, etc.) needed in a particular geographic region (e.g., a city, a neighborhood, or any geographic region) to be "covered", defined by, for example, a number at which providing a single additional renderable data object results in a measureable and/or objective improvement to, for example a measurable metric (e.g., conversion rate or the like) of less than a pre-defined threshold value (e.g., 1%, 2%, etc.) of the metric.

For example, in some embodiments, fully covered for some portion of geographic regions is when the next incremental merchant is expected to generate less than 1% increase in conversion. Applying the coverage cap is performed by, for example, consulting or accessing coverage map tables/graphs to identify a cap and comparing the summed total to the coverage cap.

In some embodiments, a comparison is made between the summed total and the coverage cap. The system is configured to determine capped score by comparing coverage cap to summed total, and if coverage cap is less than summed total, capped score is set equal to coverage cap, whereas if coverage cap is greater than summed total, capped score is set to the summed total. For example, in an instance in which the coverage cap is 8 and summed score is 10, capped total is set to 8, whereas coverage cap is 10 and summed total is 8, capped total is set to 8.

In some embodiments, the previous steps are performed for each of a plurality of customers. As a result, for each of the plurality of customers, a capped score has been calculated for each of a plurality of categories.

As shown in block 340 of FIG. 3, an apparatus, such as apparatus 200, may be configured for aggregating, for each of the plurality of customers, the capped scores for each of a plurality of categories. For pre-defined geographic regions, the system is configured to determine and/or calculate a score (e.g., indicative of the "health" of the supply from a customer perspective). For example, each user within the predefined geographic region is identified, the capped scores associated with each of the identified individuals is averaged. In other embodiments, a median or mode may be used. In some embodiments, each user's contribution to the score associated with a geographic region could be weighted, for example, by the distance from the center of the predefined geographic region to the location associated with the user.

By aggregating, not only each customer, but each of a plurality of predefined geographic locations, an index may be generated, which as has been described above, is indicative of the adequacy or "health" of the supply from a customer perspective. The index may be configured to show or otherwise enable a user to access a number of metrics. For example, a salesperson may access the index to determine which of a number of leads to pursue. That is, conventional systems provide information or utilize a prioritization method that is based on absolute gross bookings (GB), and as such, when not restricted to geographic zones, those conventional systems gravitate towards the same services and locations that deliver the highest absolute return, regardless of incremental gain—meaning, due to cannibalization of profits, a large absolute return may be the result of a customer not buying from an existing merchant. The incremental gain may be very low, near zero, in saturated markets.

As shown in block 345 of FIG. 3, an apparatus, such as apparatus 200, may be configured for generating a supply index comprised of aggregated, from each of the plurality of individual customers, capped totals. That is, the index may comprise, for each of a plurality of geographic regions, a customer-centric metric indicative of the adequacy of the supply available to customer located therein.

To do this, the system may be configured to perform the above steps described in blocks 305-340 for each of a plurality of customers. Upon determination of the capped total for each of the plurality of customers, the capped totals may be aggregated forming the supply index.

Travel Propensity

FIG. 4B describes a more general process of determining travel propensity. In particular, FIG. 4B illustrates a flow diagram depicting an example of a process 440 for determining those promotions included with the travel propensity of a user location. The process 440 illustrates how a user location is first classified to a particular type of geo-location and based on the classification, performing a process to determine one or more promotions within the travel propensity of the user location. The process 450 may be performed by elements of an apparatus 200, such as location services circuitry 210 acting in concert with travel propensity circuitry 212, as described above with respect to FIG. 2.

As shown in block 445 of FIG. 4B, an apparatus, such as apparatus 200, may be configured for classifying each of a plurality of geographic regions as one geographic region type of a predefined number of geographic region types. As described above with respect to FIG. 4A, geographic region types may be neighborhood, suburb, small markets, etc., each having particular characteristics enabling the classification.

In some embodiments, the classification may be performed, for example, by machine learning. In particular, an apparatus, such as apparatus 200, may be configured for training one or more data models based on, for example, one or more identifiable characteristics (e.g., population density or the like) of, for example, particular geographic regions. Subsequently, the apparatus may be configured for accessing a corpus, wherein the corpus is comprised of documents representing each of a plurality of defined geographic region types. The system may then apply a particular model to the corpus, for example, depending on the characteristics of the geographic region or the like, classifying the documents in the corpus by real-time relevancy. As such, the apparatus may be configured for applying a particular model to the corpus. That is, the documents in the corpus may be classified by their immediate, near immediate, or real-time similarity to a geographic region type.

Once a model has been derived from an initial training data set, the system may be configured to monitor performance of the model and update the training data set so that the model may be adapted incrementally, for example, to better reflect the behavior of consumers located within a geographic region type. Incremental adaptation of a model reduces the costs involved in repeatedly replacing the model.

In other embodiments, classification may be performed by a relevancy analysis. That is, given particular characteristics of a particular geographic region, the system may be configured to identify which of the predefined geographic region types is most similar to the particular geographic region.

As shown in block 450 of FIG. 4B, an apparatus, such as apparatus 200, may be configured for mapping each of a plurality of redemption locations, each redemption location associated with a merchant and indicative of a location at which a renderable data object is redeemable, to one of the geographic region types.

As shown in block 455 of FIG. 4B, an apparatus, such as apparatus 200, may be configured for calculating, for a first geographic region type, a first distance that accounts for a predefined number of redemptions, based on historical purchase data. As described above, in some embodiments, this may mean identifying a distance from which those who account for 75% of sales come from. That is, customers traveling within, for example, 15 miles, account for 75% of redemptions.

As shown in block 460 of FIG. 4B, an apparatus, such as apparatus 200, may be configured for assigning the first distance as a first geographic region type travel propensity. This distance, for example, 15 miles, may then be assigned as the travel propensity for this geographic region type. In some embodiments, calculating the distance that accounts for the predefined number of redemption includes utilizing historical redemption data to identify, for each merchant within a geographic region of the first geographic region type, from how far a customer traveled to redeem a renderable data object at the redemption location associated for each particular merchant.

As shown in block 465 of FIG. 4B, an apparatus, such as apparatus 200, may be configured for determining a number of merchants having redemption locations within the first distance.

As shown in block 470 of FIG. 4B, an apparatus, such as apparatus 200, may be configured for calculating a second distance, from a center of a geographic region of the second geographic region type, necessary to include the number of merchants having redemption locations within the first distance. As shown in block 475 of FIG. 4B, an apparatus, such as apparatus 200, may be configured for assigning the second distance as the second geographic region type travel propensity.

As shown in block 480 of FIG. 4B, an apparatus, such as apparatus 200, may be configured for identifying a first location associated with a first user. In some embodiments, identifying the first location of the first user comprises receiving at least one Global Positioning System (GPS) device locations from at least one mobile communication device associated with the first user, the GPS device locations received via a location service element, which receives the GPS locations directly or indirectly from the mobile communication device. In other embodiments, identifying the first location of the first user comprises receiving a plurality of GPS device locations, each from one of a plurality of mobile communication devices, each associated with a different user; clustering a portion of the plurality of GPS device locations from a geographic region to a single GPS location, reducing a number of times at least a portion of each of one or more renderable data objects available to a user located at the first location must be identified.

As shown in block 485 of FIG. 4B, an apparatus, such as apparatus 200, may be configured for determining the geographic region type from the plurality of geographic region types to which the particular location associated with the first user belongs. As shown in block 490 of FIG. 4B, an apparatus, such as apparatus 200, may be configured for accessing a distance calculated as the travel propensity for the geographic region type from the plurality of geographic region types to which the particular location associated with the first user belongs.

As shown in block 495 of FIG. 4B, an apparatus, such as apparatus 200, may be configured for assigning the distance as the customer specific travel propensity, the customer specific travel propensity configured to be utilized to identify a number of merchants having redemption locations within the distance.

Coverage

Conventional system may be configured to prioritize leads based on expected absolute GB (either by prior performance or the performance of a similar PDS deals) and does not directly take into account what deals are currently live. As such, the promotion and marketing system is often closing deals that provide users with the same utility, creating cannibalization. For example, the promotion and marketing system may have 162 F & D merchants live in Chicago proper but only 11 F & D merchants live in Winnetka. Leveraging the historical relationship between user engagement (Deal Views per Browse session) and inventory (indexed for deal quality) for each unique neighborhood/city (not division) and customer taxonomy (L2-4) combination (i.e., Evanston/Gyms) for TTM, the promotion and marketing system may be configured to: 1) estimate the Incremental 30-day gross revenue (GR) conversion per 1 more merchant live based on current demand; 2) to define what 100% Covered means in terms of Required Deals Live; and 3) calculate Absolute Coverage Rate and GR-Weighted Coverage Rate.

FIG. 6 illustrates a flow diagram depicting an example of a process 600 for prioritizing promotion and marketing system activity, for example in pursuing new business, in accordance with some exemplary embodiments of the present invention. The process 600 illustrates how incremental GR potential is being combined with conventional absolute GB projection to prioritize tactical rankings, for example, regarding promotion and marketing system activity in the pursuit of new business and, in other embodiments, for more efficient bidding, in systems that may require it. The process 600 may be performed by elements of an apparatus 200, such as location services circuitry 210 and/or coverage cap circuitry 216 as described above with respect to FIG. 2.

FIG. 6 shows that the system may be configured to utilize conversion curves based on historical relationship between Browse DV conversion and Inventory at the city level, samples of which are show in FIGS. 7A-7D. The distances for calculation of relevant inventory based on historical customer's propensity to travel for that city and category. Inventory may be categorized by deal type (regular, GTG, G3, etc.), metal segmentation (Platinum, Gold, etc.), and market rate type (regular, market rate, STPS). Quality-adjustment may be performed to inventory based on historical DV conversion rates, by deal type, metal segmentation and market rate type.

If a specific conversion curve is not significant for respective series, the model is a series of fallback curves. Incremental 30-day GR may be based on curve*historical GR/DV*30-day # of Browse Sessions/(Category's Browse GB/Total GB). In some embodiments, neighborhood category distance of travel based on city category lead density/radius of travel. The top, for example, 50 cities may be considered "fully covered" when the next incremental merchant is expected to generate less than, for example, 1% increase in conversion. The threshold may be 2% for 50+ markets.

As such, as shown in block 605 of FIG. 6, an apparatus, such as apparatus 200, may be configured to test each node's historical statistical significance to see if it can be used for a projection. User Engagement is defined as Deal Views per Browse T1/T2 Customer Taxonomy Sessions (i.e., Massage for T2 and Beauty & Spas for T1). Inventory is indexed for deal quality (e.g., TMC/QLR/QLA/Exceptions/STPS) based on historical conversion rates (i.e., TMC converts 1.4x) measured at 5 miles from the city center [geo cat SEM pins]. A binary CRM flag is also used as a 2nd independent variable to remove effect of campaigns on conversation based on if Order Discount's spent represented more than 1.5% of Total GB collected. Each data point is daily with a minimum of, for example, at least 24 days to ensure a minimum sample size. A unique minimum sessions per day is used for each node to remove the denominator effect. Logarithmic curves used to measure the relationship with Statistical Significance being if 1) the curve was positive with outlier coefficients 2) $R^2>10\%$ 3) P-Value <0.10. Curves with outlier log coefficients, where log coefficients were greater than 0.73, twice the average of Statistically Significant curve's log coefficients, were also eliminated from model options. Sample curves are provided at FIGS. 7A-7D.

Clean taxonomies are provided such that SEO names match SEM categories. For example, in the process, the L2 taxonomy Home Improvement changes to Home Services. The Health & Fitness L2 is parsed into two separate L2s, Health and Fitness, and L3s distributed accordingly between the two.

As shown in block 610 of FIG. 6, an apparatus, such as apparatus 200, may be configured to cluster cities into groups, which will be used to differentiate larger cities from smaller cities. In some embodiments, the apparatus may be configured to assign peer city groups to each city based on similar levels of total inventory. 20 peer city groups exist in total. Subsequently, the apparatus may be configured to assign broader peer city buckets to each city based on similar levels of total inventory. These are determined by sorting cities in descending order by total inventory levels and clustering groups making up every 20% of total cumulative inventory. 5 peer city buckets are created in total.

As shown in block 615 of FIG. 6, an apparatus, such as apparatus 200, may be configured to determine tourist vs. non-tourist cities by comparing supply vs. demand GB, to help calculate number of sightseeing deals needed. In some embodiments, cities may be tagged as tourist cities if their divisions' supply GB exceeded demand GB by 10% or more. The apparatus may be configured to choose the best statistically significant curves for each L3 to model each L3-city node. Not every L3 has a statistically significant curve, in which case the L3-city nodes would be represented by the best statistically significant L2 curve for that L3's L2. Nodes where the L3 is sightseeing are represented by two different sightseeing curves, depending on whether a city is a tourist city or not. The two best significant sightseeing curves, one for Williamsburg and one for Albuquerque, have a large difference in log coefficients. As Williamsburg has more tourism, an associated log coefficient is above average at 0.5, while Albuquerque's is below average at 0.12. The average log coefficient among model curves is 0.23. The Williamsburg curve is used to represent sightseeing in tourist cities, and Albuquerque's in non-tourist cities.

As shown in block 620 of FIG. 6, an apparatus, such as apparatus 200, may be configured to perform a quality-adjustment to inventory based on historical DV conversion rates, by deal type, metal segmentation and market rate type. The apparatus may be configured to label all inventory by three dimension: Deal Type, Metal Segmentation, and Market Rate Type. Subsequently, the apparatus may be configured to index all inventory based on historical DV conversion rates. (Using regular bronze, non-market rate as baseline). All inventory nodes being used in the curve calculation are quality adjusted.

As shown in block 625 of FIG. 6, an apparatus, such as apparatus 200, may be configured to, once a statistically significant curve is obtained/determined, calculate the inventory as of current date to get the expected Incremental GB per 1 new live deal. The Log equation provides Incremental Browse DV per sessions. Browse GB per Browse DV is calculated using FY14 data for that specific node to get Incremental Browse GB per session. If the specific node doesn't have a conversion rate or if fewer than 20 sessions exist, then use the taxonomy's weighted average. The apparatus may be configured to multiply Incremental Browse GB per session by Monthly Browse Sessions and the category's weighted margin to get 30-day Incremental Browse GR per 1 deal. Lastly, the apparatus may be configured to divide the 30-day Incremental Browse GR by Browse GB/Total GB to get the potential company-wide impact. The apparatus may then be configured to calculate the Incremental GB by Deal Type based on historical conversion (i.e., getting a TMC deal live is worth 1.44)

As shown in block 630 of FIG. 6, an apparatus, such as apparatus 200, may be configured to identify location-agnostic L3s using willingness to travel. For these L3s, full coverage will be determined at the city level, and not neighborhood. For each city, the radius of travel for each L3 is measured against the average radius to travel of all neighborhoods' three L3s with the lowest willingness to travel: coffee & treats, restaurants, and gyms. If the radius of travel for an L3 in a neighborhood is over 50% more than the average of that city's radius for these L3s, it is flagged. Across all cities, if an L3 has more than 40% of its neighborhood data points flagged, it is location-agnostic. This analysis done among the top 22 market's neighborhoods shows 31 L3s are location agnostic, including home services L3s, electronics repair, sightseeing, and activities As shown in block 635 of FIG. 6, an apparatus, such as apparatus 200, may be configured to calculate total deals needed to be covered, by neighborhood and by city, in MECE and non-MECE scenarios.

Non-MECE scenario: A location is fully covered at the point where adding one more deal grows incremental deal views per session by only 1%. With the derivative of the log equation relating inventory to DV/S equaling the log coefficient over inventory, the number of deals for coverage in each location-L3 combination equals the log coefficient of the node's model divided by 0.01.

In the case of smaller cities, which are cities in inventory peer group 5 or above, full coverage is reached when adding another deal only increases deal views per session by 2%.

The apparatus may be configured to adjust full coverage deals down to align with lead pool: the number of deals recommended is capped at 75% of the neighborhood's number of leads for that L3.

Among cities which have been broken down to the neighborhood level, the apparatus may be configured to take the city-level recommendation for location agnostic L3s and the neighborhood-level recommendation for non-location-agnostic L3s.

MECE scenario: the apparatus may be configured to keep same recommendations as determined in the non-MECE scenario, except at the neighborhood level. Within neighborhoods, the MECE number of deals recommended are adjusted down by an index. The index is the number of quality-adjusted duplicate leads available divided by the quality-adjusted number of unique accounts available.

As shown in block 640 of FIG. 6, an apparatus, such as apparatus 200, may be configured to calculate which additional deals to prioritize next month, for example, assuming the promotion and marketing system or representatives thereof will close the monthly local average of deals (e.g., 6,000).

The apparatus may be configured to choose deals by optimizing on incremental GR/deal and GB/S. Among top 25 markets, deals may be chosen to optimize return on acquisition investment. Deals are added as long as GB/S is greater than or equal to 8.5 cents, the average cost of acquiring a deal view. 4,448 deals are added from this method. Among all other markets, the remaining 1,552 deals are chosen from the deals offering the highest incremental GR/deal. Out of these deals, the minimum GR/deal is $229.

The apparatus may be configured to predict total expected incremental GR in one month from the 6,000 deals chosen by the coverage model vs. an average deal. The 6,000 deals chosen by the coverage model are each assigned a probability of closing, assuming these deals may be harder than current deals to close. Multiplied against their modeled incremental GR/deal gives the final expected incremental GR/deal. The product of the model's average incremental GR of $59/deal and 6,000 average deals added determines the total incremental GR/deal in a scenario of reps closing deals without using the coverage model.

As will be appreciated, computer program code and/or other instructions may be loaded onto a computer, processor or other programmable apparatus's circuitry to produce a machine, such that execution of the code on the machine by the computer, processor, or other circuitry creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or a combination of software and hardware. Furthermore, embodiments may take the form of a computer program product on at least one computer-readable storage medium having computer-readable program instructions (e.g., computer software) embodied in the storage medium. Any suitable computer-readable storage medium may be utilized, including non-transitory hard disks, CD-ROMs, flash memory, optical storage devices, magnetic storage devices, or the like.

Embodiments of the present invention have been described above with reference to block diagrams and flowchart illustrations of methods, apparatuses, systems and computer program products. It will be understood that each block of the circuit diagrams and process flowcharts, and combinations of blocks in the circuit diagrams and process flowcharts, respectively, can be implemented by various means including computer program instructions. These computer program instructions may be loaded onto a general purpose computer, special purpose computer, or other programmable data processing apparatus to produce a machine, such that the computer program product includes the instructions which execute on the computer or other programmable data processing apparatus create a means for implementing the functions specified in the flowchart block or blocks.

These computer program instructions may also be stored in a computer-readable storage device that can direct a computer or other programmable data processing apparatus to function in a particular manner, such that the instructions stored in the computer-readable storage device produce an article of manufacture including computer-readable instructions for implementing the function discussed herein. The computer program instructions may also be loaded onto a computer or other programmable data processing apparatus to cause a series of operational steps to be performed on the computer or other programmable apparatus, thereby producing a computer-implemented process such that the instructions executed on the computer or other programmable apparatus cause performance of the steps and thereby implement the functions discussed herein.

Accordingly, blocks of the block diagrams and flowchart illustrations support combinations of means for performing the specified functions, combinations of steps for performing the specified functions and program instruction means for performing the specified functions. It will also be understood that each block of the circuit diagrams and process flowcharts, and combinations of blocks in the circuit diagrams and process flowcharts, can be implemented by special purpose hardware-based computer systems that perform the specified functions or steps, or combinations of special purpose hardware and computer instructions.

Many modifications and other embodiments of the inventions set forth herein will come to mind to one skilled in the art to which these embodiments of the invention pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising at least one processor and at least one memory having computer-coded instructions stored thereon that, in execution with the at least one processor, causes the apparatus to:
   determine, for a first geographic region type, a first distance based at least in part on a number of redemptions represented in historical purchase data corresponding to historical location data within a first geographic region;
   assign the first distance as a first geographic region type travel propensity;
   determine a number of merchants having redemption locations within the first distance;
   determine, for a second geographic region type, a second distance that includes a same number of redemptions for a second geographic region within the second distance as the number of redemptions for the first geographic region;
   assign the second distance as a second geographic region type travel propensity;
   determine a particular real-time location of a mobile computing device, the mobile computing device associated with a first user;

generate, based on the real-time location of the mobile computing device associated with the first user and utilizing at least one specially trained machine learning model, a user specific travel propensity associated with the mobile computing device, wherein the user specific travel propensity comprises a distance which the first user is determined as willing to travel to redeem a renderable data object, and wherein generating the user specific travel propensity comprises determining the user specific travel propensity based on a geographic region type travel propensity of a geographic region type corresponding to the real-time location of the mobile computing device;

identify a number of merchants associated with at least one redemption location within the distance of the user specific travel propensity from the real-time location of the mobile computing device;

determine, based at least in part on the number of merchants, a renderable data objects set that is available to the mobile computing device; and iteratively update the at least one specially trained machine learning model based at least in part on at least one interaction between the first user and any one or more of the renderable data objects of the renderable data objects set that is available to the first user.

2. The apparatus according to claim 1, further caused to:

classify each of a plurality of geographic regions to a particular geographic region type of a predefined number of geographic region types; and map each of a plurality of redemption locations, each mapped redemption location associated with a merchant and indicative of a location at which a renderable data object is redeemable, to one of the geographic region types, wherein the first distance and the second distance are determined based at least in part on the mapped redemption location associated with each merchant.

3. The apparatus according to claim 1, wherein to determine the particular real-time location of the mobile computing device, the apparatus is caused to:

receive at least one GPS device location in real-time from the mobile computing device.

4. The apparatus according to claim 1, wherein the at least one specially trained machine learning model is configured to determine a particular geographic region type to which the real-time location of the mobile computing device belongs.

5. The apparatus according to claim 1, further caused to:

determine, via the at least one specially trained machine learning model, that the real-time location of the mobile computing device belongs to the second geographic region type; and in response to determining that the real-time location of the mobile computing device belongs to the second geographic region type, assign the second distance as the user specific travel propensity.

6. The apparatus according to claim 1, wherein to determine the particular real-time location of the mobile computing device, the apparatus is caused to:

determine the real-time location of the mobile computing device based at least in part on data indicating a wireless station with which the mobile computing device is communicable.

7. The apparatus according to claim 1, wherein to iteratively update the at least one specially trained machine learning model, the apparatus is caused to:

update training of the at least one specially trained machine learning model based at least in part on whether the first user redeemed at least one of the renderable data objects of the renderable data objects set.

8. A computer-implemented method comprising:

determining, for a first geographic region type, a first distance based at least in part on a number of redemptions represented in historical purchase data corresponding to historical location data within a first geographic region;

assigning the first distance as a first geographic region type travel propensity;

determining a number of merchants having redemption locations within the first distance;

determining, for a second geographic region type, a second distance that includes a same number of redemptions for a second geographic region within the second distance as the number of redemptions for the first geographic region;

assigning the second distance as a second geographic region type travel propensity;

determining a particular real-time location of a mobile computing device, the mobile computing device associated with a first user;

generating, based on the real-time location of the mobile computing device and utilizing at least one specially trained machine learning model, a user specific travel propensity associated with the mobile computing device, wherein the user specific travel propensity comprises a distance which the first user is determined as willing to travel to redeem a renderable data object, and wherein generating the user specific travel propensity comprises determining the user specific travel propensity based on a geographic region type travel propensity of a geographic region type corresponding to the real-time location of the mobile computing device;

identifying a number of merchants associated with at least one redemption location within the distance of the user specific travel propensity from the real-time location of the mobile computing device;

determining, based at least in part on the number of merchants, a renderable data objects set that is available to the mobile computing device; and iteratively updating the at least one specially trained machine learning model based at least in part on at least one interaction between the first user and any one or more of the renderable data objects of the renderable data objects set that is available to the first user.

9. The computer-implemented method according to claim 8, further comprising:

classifying each of a plurality of geographic regions to a particular geographic region type of a predefined number of geographic region types; and mapping each of a plurality of redemption locations, each mapped redemption location associated with a merchant and indicative of a location at which a renderable data object is redeemable, to one of the geographic region types, wherein the first distance and the second distance are determined based at least in part on the mapped redemption location associated with each merchant.

10. The computer-implemented method according to claim 8, wherein determining the real-time location of the mobile computing device comprises:

receiving at least one GPS device location in real-time from the mobile computing device.

11. The computer-implemented method according to claim 8, wherein the at least one specially trained machine learning model is configured to determine a particular geographic region type to which the real-time location of the mobile computing device belongs.

12. The computer-implemented method according to claim 8, further comprising:
determining, via the at least one specially trained machine learning model, that the real-time location of the mobile computing device belongs to the second geographic region type; and
in response to determining that the real-time location of the mobile computing device belongs to the second geographic region type, assigning the second distance as the user specific travel propensity.

13. The computer-implemented method according to claim 8, wherein determining the particular real-time location of the mobile computing device comprises:
determining the real-time location of the mobile computing device based at least in part on data indicating a wireless station with which the mobile computing device is communicable.

14. The computer-implemented method according to claim 8, wherein iteratively updating the at least one specially trained machine learning model:
updating training of the at least one specially trained machine learning model based at least in part on whether the first user redeemed at least one of the renderable data objects of the renderable data objects set.

15. A computer program product comprising at least one non-transitory computer-readable storage medium having computer program code stored thereon that in execution with at least one processor is configured to:
determine, for a first geographic region type, a first distance based at least in part on a number of redemptions represented in historical purchase data corresponding to historical location data within a first geographic region;
assign the first distance as a first geographic region type travel propensity;
determine a number of merchants having redemption locations within the first distance;
determine, for a second geographic region type, a second distance that includes a same number of redemptions for a second geographic region within the second distance as the number of redemptions for the first geographic region;
assign the second distance as a second geographic region type travel propensity;
determine a particular real-time location of a mobile computing device, the mobile computing device associated with a first user;
generate, based on the real-time location of the mobile computing device associated with the first user and utilizing at least one specially trained machine learning model, a user specific travel propensity associated with the mobile computing device, wherein the user specific travel propensity comprises a distance which the first user is determined as willing to travel to redeem a renderable data object, and wherein generating the user specific travel propensity comprises determining the user specific travel propensity based on a geographic region type travel propensity of a geographic region type corresponding to the real-time location of the mobile computing device;
identify a number of merchants associated with at least one redemption location within the distance of the user specific travel propensity from the real-time location of the mobile computing device;
determine, based at least in part on the number of merchants, a renderable data objects set that is available to the mobile computing device; and
iteratively update the at least one specially trained machine learning model based at least in part on at least one interaction between the first user and any one or more of the renderable data objects of the renderable data objects set that is available to the first user.

16. The computer program product according to claim 15, further caused to:
classify each of a plurality of geographic regions to a particular geographic region type of a predefined number of geographic region types; and
map each of a plurality of redemption locations, each mapped redemption location associated with a merchant and indicative of a location at which a renderable data object is redeemable, to one of the geographic region types,
wherein the first distance and the second distance are determined based at least in part on the mapped redemption location associated with each merchant.

17. The computer program product according to claim 15, wherein to determine the particular real-time location of the mobile computing device, the computer program product is configured to:
receive at least one GPS device location in real-time from the mobile computing device.

18. The computer program product according to claim 15, wherein the at least one specially trained machine learning model is configured to determine a particular geographic region type to which the real-time location of the mobile computing device belongs.

19. The computer program product according to claim 15, further caused to:
determine, via the at least one specially trained machine learning model, that the real-time location of the mobile computing device belongs to the second geographic region type; and
in response to determining that the real-time location of the mobile computing device belongs to the second geographic region type, assign the second distance as the user specific travel propensity.

20. The computer program product according to claim 15, wherein to determine the particular real-time location of the mobile computing device the computer program product is configured to:
determine the real-time location of the mobile computing device based at least in part on data indicating a wireless station with which the mobile computing device is communicable.

* * * * *

UNITED STATES PATENT AND TRADEMARK OFFICE
CERTIFICATE OF CORRECTION

| | | |
|---|---|---|
| PATENT NO. | : 12,067,585 B2 | Page 1 of 1 |
| APPLICATION NO. | : 18/063571 | |
| DATED | : August 20, 2024 | |
| INVENTOR(S) | : Andrew Lisy et al. | |

It is certified that error appears in the above-identified patent and that said Letters Patent is hereby corrected as shown below:

On the Title Page

In Column 2, item (57), Abstract, Line 4, delete "provided An" and insert -- provided. An --, therefor.

Signed and Sealed this
Seventeenth Day of December, 2024

Derrick Brent
*Acting Director of the United States Patent and Trademark Office*